United States Patent
Balter et al.

(10) Patent No.: US 9,577,704 B2
(45) Date of Patent: *Feb. 21, 2017

(54) SATELLITE COMMUNICATIONS MANAGEMENT SYSTEM

(71) Applicant: The Boeing Company, Chicago, IL (US)

(72) Inventors: Irwin Balter, Los Angeles, CA (US); Dennis Gottman, Manhattan Beach, CA (US); Bret Michael Botzong, Rancho Palos Verdes, CA (US); John M. Sullivan, Manhattan Beach, CA (US)

(73) Assignee: THE BOEING COMPANY, Chicago, IL (US)

(*) Notice: Subject to any disclaimer, the term of this patent is extended or adjusted under 35 U.S.C. 154(b) by 98 days.

This patent is subject to a terminal disclaimer.

(21) Appl. No.: 13/763,108

(22) Filed: Feb. 8, 2013

(65) Prior Publication Data

US 2015/0131703 A1  May 14, 2015

Related U.S. Application Data

(60) Provisional application No. 61/605,610, filed on Mar. 1, 2012.

(51) Int. Cl.
  *H04B 1/00* (2006.01)
  *H04B 1/715* (2011.01)
  *H04B 7/185* (2006.01)

(52) U.S. Cl.
  CPC ......... *H04B 1/715* (2013.01); *H04B 7/18513* (2013.01)

(58) Field of Classification Search
  CPC .. G01S 1/00; G01S 19/24; H04B 1/38; H04B 1/66; H04B 7/19; H04B 17/00;
  (Continued)

(56) References Cited

U.S. PATENT DOCUMENTS 5,506,863 A * 4/1996 Meidan ................ H04B 1/713
                                                          375/134
5,583,517 A * 12/1996 Yokev .................... G01S 1/026
                                                          342/442

(Continued)

FOREIGN PATENT DOCUMENTS

EP  0948146 A1  10/1999
EP  1079546 A2  2/2001

(Continued)

OTHER PUBLICATIONS

Asato et al., "A High-Capacity, Anit-Jam EHF 'Bent-Pipe' Sattelite/Central-Hub System Architecture Concept," IEEE Military Communications Conference, Conference Record vol. 2, Nov. 1995, pp. 722-730.

(Continued)

*Primary Examiner* — Shawkat M Ali
(74) *Attorney, Agent, or Firm* — Yee & Associates, P.C.

(57) ABSTRACT

A method and apparatus for processing a signal is present. Information is carried in a frequency hopping signal. The frequency hopping signal is sent to a gateway in a communications network through a satellite. The frequency hopping signal is unprocessed by the satellite to identify the information in the frequency hopping signal.

15 Claims, 17 Drawing Sheets

(58) Field of Classification Search
CPC .......... H04B 1/00; H04B 1/713; H04B 1/715; H04B 7/00; H04B 7/185; H04B 7/204; H04L 29/04; H04Q 7/20
USPC .......... 342/257.16, 357.15, 357.63; 370/474, 370/316, 319; 375/132, 133, 135, 136, 375/137, 149, 219, 130, 214, 350; 455/115.1, 430, 12.1, 13.2, 70, 447, 500
See application file for complete search history.

(56) References Cited

U.S. PATENT DOCUMENTS

| | | | |
|---|---|---|---|
| 5,625,640 A * | 4/1997 | Palmer | H04B 7/18517 342/352 |
| 6,127,967 A | 10/2000 | Ghazvinian et al. | |
| 6,894,975 B1 | 5/2005 | Partyka | |
| 7,142,521 B2 * | 11/2006 | Haugli | H04B 7/216 370/320 |
| 7,142,580 B1 * | 11/2006 | Balachandran | H04W 16/02 375/132 |
| 7,859,464 B2 | 12/2010 | Smith et al. | |
| 8,064,920 B2 | 11/2011 | Bell et al. | |
| 8,077,652 B2 | 12/2011 | Thesling | |
| 8,275,572 B2 | 9/2012 | Burns et al. | |
| 8,488,518 B2 * | 7/2013 | Bradshaw | 370/324 |
| 2003/0203717 A1 * | 10/2003 | Chuprun et al. | 455/12.1 |
| 2004/0023658 A1 * | 2/2004 | Karabinis et al. | 455/447 |
| 2004/0185775 A1 * | 9/2004 | Bell | H04B 7/18515 455/12.1 |
| 2005/0118948 A1 * | 6/2005 | Karabinis | H04B 7/1853 455/12.1 |
| 2006/0050660 A1 * | 3/2006 | Wells | H04B 7/18582 370/316 |
| 2007/0230643 A1 * | 10/2007 | Beadle et al. | 375/350 |
| 2008/0298299 A1 * | 12/2008 | Thesling | 370/316 |
| 2010/0015971 A1 * | 1/2010 | Good | H04B 7/18563 455/427 |
| 2012/0224606 A1 * | 9/2012 | Le Boulc'H et al. | 375/132 |
| 2013/0010843 A1 * | 1/2013 | Alexopoulos et al. | 375/219 |

FOREIGN PATENT DOCUMENTS

| | | |
|---|---|---|
| EP | 1973240 A2 | 9/2008 |
| EP | 2184866 A1 | 5/2010 |
| FR | 2952451 A1 | 5/2011 |
| FR | 2954634 A1 | 6/2011 |
| RU | 2133555 C1 | 7/1999 |
| RU | 2136108 C1 | 8/1999 |
| WO | WO2011057861 A1 | 5/2011 |

OTHER PUBLICATIONS

Novello et al., "The Koreasat 5 Secure Communication System: Design, Development & Performance," IEEE Aerospace Conference, Jul. 2006, 12 pages.
International Search Report and Written Opinion, dated Jun. 21, 2013, regarding Application No. PCT/US2013/028330, 8 pages.
Balter et al., "Transponded Anti-Jam Satellite Communications," U.S. Appl. No. 13/763,024, filed Feb. 8, 2013, 130 pages.
Office Action, dated Jul. 23, 2014, regarding U.S. Appl. No. 13/763,024, 22 pages.
Federal State Intellectual Property Service of Russia Notification of Office Action and English translation, issued Feb. 16, 2016, 7 pages.

* cited by examiner

SATELLITE COMMUNICATIONS MANAGEMENT SYSTEM

CROSS-REFERENCE TO RELATED APPLICATIONS

This application is related to, and claims the benefit of priority of, provisional U.S. Patent Application Ser. No. 61/605,610, filed Mar. 1, 2012, entitled "Transponded Anti-Jam Satellite Communications," which is incorporated herein by reference. This application is also related to non-provisional U.S. patent application Ser. No. 13/763,024, filed even date herewith, entitled "Transponded Anti-Jam Satellite Communications."

BACKGROUND INFORMATION

1. Field

The present disclosure relates generally to communications and, in particular, to satellite communications. Still more particularly, the present disclosure relates to a method and apparatus for reducing interference with satellite communications.

2. Background

Many different types of satellites are present for different purposes. For example, satellites include observation satellites, communication satellites, navigation satellites, weather satellites, research satellites, and other suitable types of satellites. Additionally, space stations and human spacecraft in orbit are also satellites that may perform different purposes.

With respect to satellites, communication of information is performed by most satellites. Communications may include receiving information and transmitting information. The information received may be commands, data, programs, and other types of information. Information transmitted by satellites may include data, images, communications, and other types of information.

When a satellite is primarily used to relay communications, the satellite may relay information to different destinations across the Earth using signals. In these illustrative examples, the signals are used to establish a communications link between the satellite and another device. Typically, when communications are sent to a satellite, the communications link is in an uplink. Information transmitted by a satellite is typically in a downlink.

For example, a transmitter in one location may send information in a communications link in the form of an uplink to a satellite. The satellite may process the information and send the information in a communications link in the form of a downlink to a destination terminal in another location across the globe.

In other examples, satellites may relay the information received to multiple destination locations. For example, the information may be a video broadcast received by the satellite in signals for an uplink to the satellite by a transmitter for a user. The satellite may then retransmit this video broadcast in signals in downlinks to the multiple destination locations.

In still other examples, if the destination device is not in the coverage area of a satellite, that satellite may relay the communications to a second satellite via a communications link in the form of a satellite crosslink. The second satellite may then send the communication in a downlink to the destination location.

Users transmitting these types of communications may desire that the communications be protected from interference by others. This interference may be anything which alters, modifies, or disrupts a signal from the transmitter as the signal travels along a channel between the transmitter and the receiver. This interference may be unintentional interference from the environment or intentional interference from others. This intentional interference may be known as "signal jamming."

Signal jamming is a process of intentionally transmitting radio signals using the same or substantially the same frequencies as those in the uplink, downlink, or both the uplink and downlink to disrupt communication of information by a sender. For example, an adversary may attempt to jam communications signals from an operator at a military ground station to prevent the operator from communicating with troops in other locations. In some cases, users perform signal processing, such as frequency hopping, to protect satellite communications from signal jamming. Users may also perform signal processing. This signal processing may include, for example, without limitation, frequency hopping to protect satellite communications from unintentional sources of interference, and to prevent signal detection, signal interception, or other undesired results.

When relaying communications via satellite, some current and proposed anti-jam systems perform a large part of this signal processing onboard the satellite in orbit. This signal processing may be, for example, frequency hopping, frequency dehopping, time permutation, and time de-permutation. The signal processing also may include, for example, channel interleaving, scrambling, rotation, interspersal techniques, or other types of processing that may be used to increase the security of the communications.

In particular, frequency hopping and frequency dehopping may be used to reduce or avoid interference with communications. In other words, the frequency on which information is carried may be changed over time.

Frequency hopping involves employing a carrier frequency that changes over time. Frequency dehopping involves reversing the process of frequency hopping to identify a carrier frequency that does not change over time in order to enable extraction of the information from the carrier wave.

Signal processing can be a calculation intensive and complex process. As a result, additional equipment may be needed onboard the satellite to perform this signal processing. Consequently, currently used signal processing systems intended for use onboard satellites may increase the size, weight, and cost of the satellite.

Additionally, upgrading or changing signal processing systems may be more difficult than desired. For example, if more sophisticated equipment is needed to perform onboard signal processing on a satellite, a satellite may be modified or replaced. The process of modifying or replacing a satellite may be more time intensive and costly than desired.

In other cases, the increased size, weight, and complexity of a modified satellite may result in undesired or inefficient performance of the satellite. Therefore, it would be desirable to have a method and apparatus that takes into account at least some of the issues discussed above, as well as other possible issues.

SUMMARY

In one illustrative embodiment, a communications system comprises a number of gateways, a number of satellites, and a control system. The number of gateways is configured to send information. The control system is configured to configure the number of gateways and the number of satellites to transfer the information such that the number of satellites receive and send signals. A signal in the signals is a frequency hopping signal. The frequency hopping signal is unprocessed to identify a number of frequencies for a channel used to carry the information in the frequency hopping signal by a satellite in the number of satellites.

In another illustrative embodiment, an apparatus comprises a receiver system in a gateway and a communications processor in the gateway. The receiver system is configured to receive a signal from a satellite. The signal has a range of frequencies in which information is carried in a number of channels having a number of frequencies within the range of frequencies. The number of frequencies for the channel changes within the range of frequencies over time. The signal is unprocessed by the satellite to identify the number of frequencies for a channel in the number of channels used to carry the information by the satellite. The communications processor is configured to process the signal to identify the channel in the number of channels in the number of frequencies within the range of the frequencies to form a processed signal and transmit the processed signal to a destination device.

In yet another illustrative embodiment, a method for processing a signal is present. Information is carried in a frequency hopping signal. The frequency hopping signal is sent to a gateway in a communications network through a satellite. The frequency hopping signal is unprocessed by the satellite to identify the information in the frequency hopping signal.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that frequency dehopping and frequency hopping of a signal may be performed at a terrestrial gateway, rather than onboard the satellite. In these illustrative examples, frequency dehopping may be referred to as dehopping and frequency hopping may be referred to as hopping.

One or more illustrative embodiments provide a method and apparatus for processing a signal. A signal is received in a receiver system in a satellite. The signal has a range of frequencies in which information is carried in a number of channels having a number of frequencies within the range of frequencies. This range of frequencies may be a wideband frequency hopping signal. The channel that is identified may be the frequency or frequencies in which the information is carried. The signal is transmitted to a remote gateway location using a transmitter system in the satellite. The signal is unprocessed by the satellite to identify the channel used to carry the information.

In other words, none of the components in the satellite identify the information carried in the signal. In these illustrative examples, the satellite acts much like a transponder in which dehopping and hopping is not performed with respect to the signal. The signal is relayed by the satellite to another gateway destination where dehopping and hopping is performed.

In other words, the satellite communication system may use satellite-based transponders to relay communications to non-orbital gateway devices. As a result, the cost, complexity, and size of satellites used to relay communications between orbital and non-orbital devices may be reduced.

Figure 1:
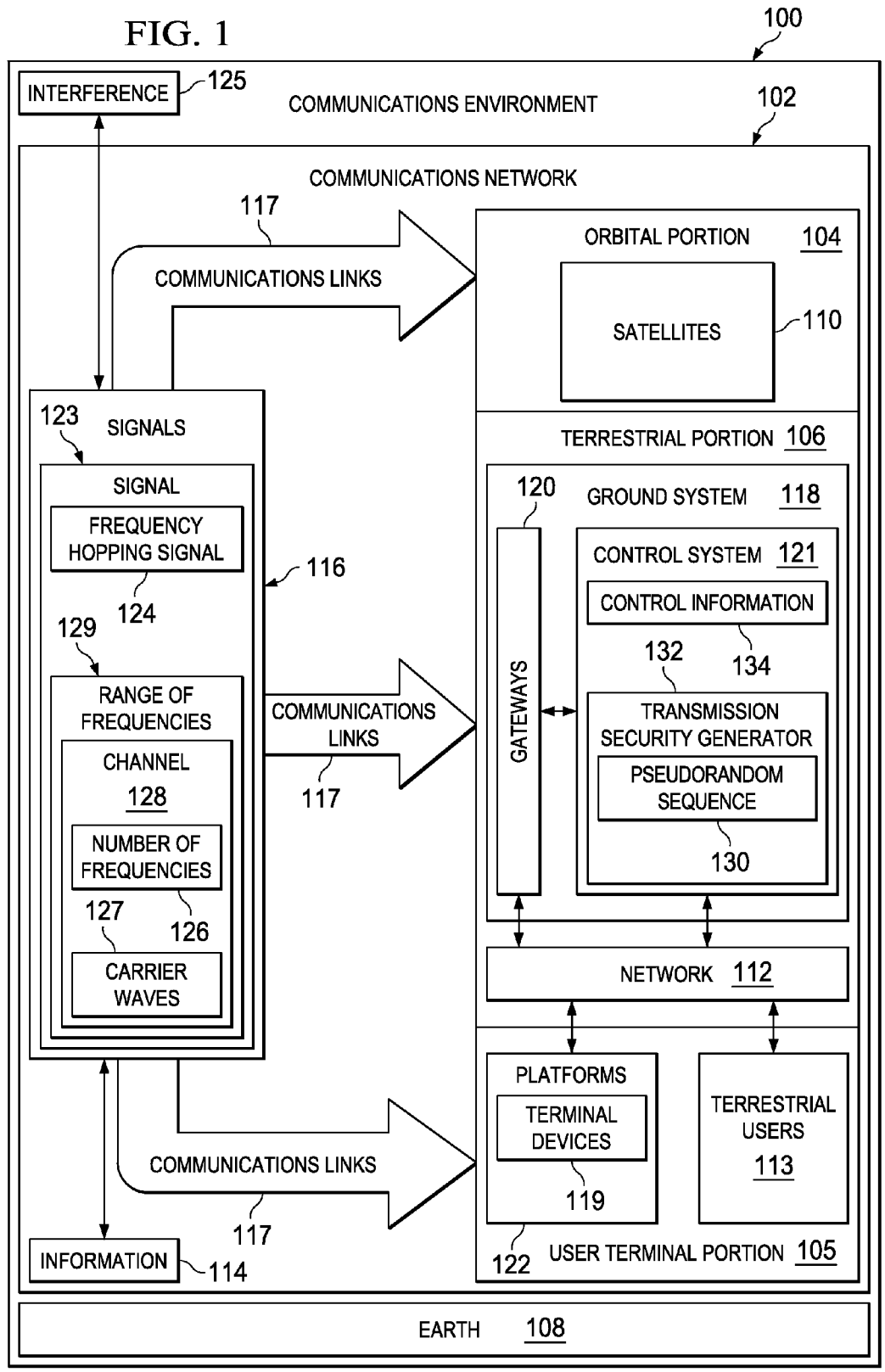
FIG. 1 is an illustration of a block diagram of a communications environment in accordance with an illustrative embodiment.

With reference now to the figures and, in particular, with reference to FIG. 1, an illustration of a block diagram of a communications environment is depicted in accordance with an illustrative embodiment. In this illustrative example, communications environment 100 includes communications network 102.

As depicted, communications network 102 has orbital portion 104, user terminal portion 105, and terrestrial portion 106. Orbital portion 104 may be any portion of communications network 102 that is located in components that may orbit Earth 108. For example, orbital portion 104 includes satellites 110 in orbit around Earth 108.

In these illustrative examples, satellites 110 are artificial objects placed into orbit around Earth 108. In some illustrative examples, satellites 110 also may include spacecraft and space stations when these spacecraft or space stations are in orbit around Earth 108.

As depicted, user terminal portion 105 includes platforms 122 which include terminal devices 119. Terminal devices 119 have direct links to satellites 110 in order to transmit information 114, receive information 114, or both transmit and receive information 114 that is to be conveyed between platforms 122 and other users in communications network 102. For example, terminal devices 119 in platforms 122 may use satellites 110 to send information 114 to other terminal devices 119 or terrestrial users 113. Platforms 122 with terminal devices 119 may be located in space, on land, in the air, on the water, under the water, or some combination thereof.

In this illustrative example, a platform in platforms 122 may be, for example, a mobile platform, a stationary platform, a land-based structure, and an aquatic-based structure. More specifically, the platform may be a surface ship, a tank, a personnel carrier, a train, a submarine, an automobile, a power plant, a bridge, a dam, a house, a manufacturing facility, a building, and other suitable platforms.

Terminal devices 119 in platforms 122 in user terminal portion 105 may be devices configured to send information 114 to satellites 110 using communications links 117 in these illustrative examples. Information 114 may then be sent via satellites 110 to other users in communications network 102.

In this illustrative example, terrestrial users 113 may be comprised of users connected to network 112. In these examples, terrestrial users 113 may be applications, computers, people, or other suitable types of users. Information 114 may be conveyed to terrestrial users 113 using satellites 110 and/or gateways 120 in ground system 118.

Terrestrial portion 106 of communications network 102 may include any devices that are located on or within the atmosphere of Earth 108. Terrestrial portion 106 may include, for example, network 112. Network 112 may be located on land, in the air, on the water, under the water, or some combination thereof.

Network 112 may take various forms. For example, network 112 may be at least one of a local area network, an intranet, the Internet, a wide area network, a circuit-switched network such as synchronous optical network (SONET), some other suitable network, or some other combination of networks. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

In other words, network 112 may be comprised of a number of different networks that may be of the same type or different types. As depicted, a number of different types of devices may be used to form network 112. For example, network 112 may include a number of different components that are configured to carry information 114 in network 112. For example, network 112 may include routers, switches, computers, and communications links. Communications links 117 between components in network 112 may be implemented using at least one of wired links, optical links, wireless links, and other suitable types of media.

In one illustrative example, information 114 may be sent through communications network 102 from terminal devices 119 in platforms 122 over signals 116 to orbital portion 104. In turn, information 114 may be relayed by satellites 110 in orbital portion 104 to the terrestrial portion 106 of communications network 102. The information may then be further relayed through the ground system 118 and network 112 of terrestrial portion 106 to terrestrial users 113 in user terminal portion 105.

In another illustrative example, information 114 may be sent through communications network 102 from terminal devices 119 in platforms 122 over signals 116 to orbital portion 104. In turn, information 114 may be relayed by satellites 110 in orbital portion 104 to the terrestrial portion 106 of communications network 102. The information may then be further relayed through the ground system 118 of terrestrial portion 106 over signals 116 to orbital portion 104. The information 114 is further relayed by satellites 110 in orbital portion 104 to the terminal devices 119 in platforms 122 in the user terminal portion 105.

In still another illustrative example, information 114 may be sent through communications network 102 from one of terrestrial users 113 in the user terminal portion 105 through the network 112 and the ground station 118 of the terrestrial portion 106. The information may then be further relayed over signals 116 through the satellite 110 in orbital portion 104 to the terminals devices 119 in platforms 122 in the user terminal portion 105.

Signals 116 may take various forms in communications network 102. For example, signals 116 may be radio frequency signals. These radio frequency signals may be susceptible to jamming by intentional or unintentional sources of interference. In other illustrative examples, signals 116 may be optical signals, electrical signals, and other suitable types of signals.

In these illustrative examples, signals 116 form communications links 117. Communications links 117 may include uplinks and downlinks. Uplinks are signals 116 that are transmitted from user terminal portion 105 or terrestrial portion 106 to orbital portion 104. Uplink signals transmitted from the user terminal portion 105 are return uplinks. Uplinks from the terrestrial potion 106 are forward uplinks. Downlinks are signals 116 that are transmitted from orbital portion 104 to user terminal portion 105 or terrestrial portion 106 of communications network 102. Downlinks to the terminal portion 105 are forward downlinks. Downlinks to the terrestrial portion 106 are return downlinks.

As depicted, ground system 118 in terrestrial portion 106 of communications network 102 is configured to exchange signals 116 containing information 114 with terminal devices 119 in platforms 122 within user terminal portion 105 using satellites 110 to relay information 114. In a similar fashion, terminal devices 119 in platforms 122 within user terminal portion 105 are configured to exchange signals 116 containing information 114 with ground system 118 in terrestrial portion 106 of communications network 102 using satellites 110 to relay information 114. Additionally, ground system 118 may further relay and exchange information 114 with terrestrial users 113 within user terminal portion 105 over network 112.

In this illustrative example, ground system 118 may be comprised of various components. As depicted, ground system 118 includes gateways 120 and control system 121.

As depicted, gateways 120 in ground system 118 are configured to provide processing for signals 116 containing information 114. For example, gateways 120 may perform processing of signals. This processing may include hopping, dehopping, permuting, depermuting, interleaving, encoding, decoding, switching, routing, and other suitable types of processing for signals 116. Additionally, in some illustrative examples, gateways 120 may provide an interface between satellites 110 in orbital portion 104 of communications network 102 and different components in terrestrial portion 106 of communications network 102.

For example, gateways 120 may provide an interface between satellites 110 and control system 121. As another example, gateways 120 may provide an interface between satellites 110, terrestrial users 113, and network 112.

In these illustrative examples, terminal devices 119 are hardware devices that process information 114. The processing of information may include at least one of hopping, dehopping, permuting, depermuting, switching, encoding, decoding, switching, routing, using, generating, storing, and other suitable types of processing of information 114. In some illustrative examples, terminal devices 119 may be configured to transmit, receive, or transmit and receive signals 116 with satellites 110 in exchanging information with satellites 110.

As depicted, terrestrial users 113 are connected to network 112. Terminal devices 119 also may be connected to network 112 in these illustrative examples. In other illustrative examples, terminal devices 119 may be remote to network 112 or otherwise unable to connect to network 112. In this case, terminal devices 119 communicate with terrestrial users 113 via satellites 110 and ground system 118.

When terminal devices 119 are connected to network 112, terminal devices 119 may exchange information using network 112. Being "connected to" network 112 does not imply that terminal devices 119 need to be physically connected to network 112. In some cases, terminal devices 119 may only be intermittently connected to network 112 or may not be connected to network 112 at all depending on the particular implementation. In other illustrative examples, a terrestrial user in terrestrial users 113 or a terminal device in terminal devices 119 may be connected to network 112 indefinitely.

In these examples, terminal devices 119 may be associated with platforms 122. Platforms 122 may take various forms. For example, a platform in platforms 122 may be selected from one of an aircraft, a surface ship, a ground vehicle, a submarine, a building, a spacecraft, a space station, a human operator, or some other suitable type of platform.

When one component is "associated" with another component, the association is a physical association in the depicted examples. For example, a first component, terminal devices 119, may be considered to be associated with a second component, platforms 122, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component. A first component may also be considered to be associated with a second component if the first component is carried by the second component.

Terminal devices 119 and terrestrial users 113 may be implemented using a number of different types of hardware. For example, a terminal device in terminal devices 119, a terminal user in terrestrial users 113, or both may be a computer, a tablet computer, a mobile phone, a laptop computer, or some other suitable device that is capable of processing information 114. For example, a suitable device may be any device that has a processor unit. Further, terminal devices 119, terrestrial users 113, or both also may be configured to include hardware that allows terminal devices 119 and terrestrial users 113 to receive signals 116.

As depicted, signal 123 in signals 116 is an example of a signal that may be used to exchange information 114 between satellites 110 in orbital portion 104 and components in user terminal portion 105 or terrestrial portion 106 of communications network 102. In these illustrative examples, signal 123 may be frequency hopping signal 124. Signal 123 may be implemented as frequency hopping signal 124 to avoid interference 125. Frequency hopping signal 124 may take the form of a frequency hopping spread spectrum signal.

In these illustrative examples, interference 125 may be intentional, unintentional, or a combination of the two. When interference 125 is intentional, interference 125 may be generated to jam the transmission of signal 123 between user terminal portion 105 and orbital portion 104 in communications network 102. In a similar fashion, interference 125 may be generated to jam the transmission of signal 123 between terrestrial portion 106 and orbital portion 104 in communications network 102.

In other words, when interference 125 is intentional, interference 125 may be used to inhibit transmission of signal 123 to a destination location. For example, an adversarial user may attempt to jam signal 123 such that information 114 in signal 123 may not reach a destination location, cannot be extracted from signal 123 at the destination location, or some combination thereof.

By changing number of frequencies 126 in range of frequencies 129 for carrier waves 127 carrying information 114 in signal 123, signal 123 takes the form of frequency hopping signal 124. The changing of number of frequencies 126 over time may be referred to as frequency hopping.

In some illustrative examples, this change of number of frequencies 126 may merely be referred to as hopping. Hopping is implemented in a manner such that the transmitting and receiving equipment synchronously change number of frequencies 126 in a pattern known to the transmitter and receiver, but unknown to potential sources of interference 125. This pattern appears pseudorandom to potential sources of interference 125. This pattern is pseudorandom sequence 130 in these illustrative examples. In other words, the pattern is a predetermined pattern in the form of pseudorandom sequence 130 that is selected ahead of time before the transmission of information 114. Thus, with the pattern being known only to the transmitter and receiver of frequency hopping signal 124, a reduction in interference 125 may occur.

In particular, with the use of frequency hopping signal 124, interference 125 is unable to change frequencies in the same manner at the same time as frequency hopping signal 124. As a result, the effects of interference 125 may be reduced or avoided when signals 116 are exchanged between orbital portion 104 and at least one of user terminal portion 105 and terrestrial portion 106 of communications network 102 using frequency hopping signal 124. In particular, frequency hopping signal 124 may reduce interference 125 when frequency hopping signal 124 is used to send information 114 between and among terminal devices 119, gateways 120, and terrestrial users 113, using satellites 110.

As depicted, information 114 is extracted from frequency hopping signal 124 by knowing the values for number of frequencies 126 at the different points in time. This process of extracting information 114 from frequency hopping signal 124 may be referred to as frequency dehopping. In other illustrative examples, the process may merely be referred to as dehopping.

With currently available satellite communications systems, dehopping of frequency hopping signal 124 is performed in satellites 110 in orbital portion 104 of communications network 102. Performing dehopping of frequency hopping signal 124 in satellites 110 requires the use of processing resources in satellites 110. In other words, with some currently available satellite communications systems, components and processor units needed to perform complex signal processing operations are located onboard satellites 110 in orbit.

With an illustrative embodiment, however, the processing of signal 123 carrying information 114 in the form of frequency hopping signal 124 exchanged between terminal devices 119 in platforms 122, terrestrial users 113, and ground system 118 is performed in terrestrial portion 106 of communications network 102. In particular, hopping and dehopping of signal 123 may be performed by ground system 118 instead of satellites 110.

Hopping, dehopping, or both hopping and dehopping of frequency hopping signal 124 may be performed by at least one of gateways 120 and control system 121 in ground system 118. Other processing operations such as permuting, depermuting, interleaving, encoding, decoding, switching, routing, and other suitable types of processing also may be performed in terrestrial portion 106 of communications network 102 instead of being performed by satellites 110 in orbital portion 104 of communications network 102.

As a result, processing resources in satellites 110 are not needed to perform at least one of hopping or dehopping of frequency hopping signal 124. Instead, satellites 110 may relay signal 123 to terrestrial portion 106 of communications network 102. The hopping and dehopping of signals 116 are performed by different components in terrestrial portion 106 of communications network 102.

Thus, resources in satellites 110 may be made available for other uses. Further, the amount of equipment needed for satellites 110 may be reduced. As a result, the size, weight, complexity, and cost may also be reduced for satellites 110. Moreover, refurbishment or replacement of satellites 110 is not needed to provide capabilities for performing hopping and dehopping of signal 123.

In these illustrative examples, when frequency hopping signal 124 is transmitted over number of frequencies 126, number of frequencies 126 may be changed in a random or pseudorandom manner. Number of frequencies 126 may be changed such that number of frequencies 126 is within range of frequencies 129. Range of frequencies 129 may be wideband frequencies in these illustrative examples. In other words, the satellite communication system may use wideband frequency hopping signals to provide anti-jam protection from interference 125.

For example, this change in number of frequencies 126 for channel 128 may be based on pseudorandom sequence 130. In this case, a frequency for frequency hopping signal 124 may be changed over time in a pseudorandom manner. Pseudorandom sequence 130 may be used to identify information 114 carried in frequency hopping signal 124. In particular, pseudorandom sequence 130 may be number of frequencies 126 at a particular point in time.

In these illustrative examples, transmission security generator 132 is configured to generate pseudorandom sequence 130. Pseudorandom sequence 130 is used to change number of frequencies 126 in frequency hopping signal 124. In other words, pseudorandom sequence 130 is used to perform hopping and dehopping of frequency hopping signal 124. For example, gateways 120 may use pseudorandom sequence 130 to select number of frequencies 126 for hopping or dehopping frequency hopping signal 124. In a similar fashion, terminal devices 119 also may use pseudorandom sequence 130 for hopping or dehopping frequency hopping signal 124.

In these illustrative examples, at least one of the generation, storage, and distribution of pseudorandom sequence 130 may be managed by control system 121. For example, a centralized control system 121 may distribute pseudorandom sequence 130 to gateways 120 for use in hopping and dehopping operations. Pseudorandom sequence 130 may be a pseudorandom noise code in these illustrative examples.

Further, when satellites 110 do not perform either dehopping or hopping of signals 116, pseudorandom sequence 130 is not sent to satellites 110. As a result, increased security may occur with respect to hopping and dehopping of signals 116.

As depicted, control system 121 may be configured to manage the operation of one or more of gateways 120 and satellites 110. In these illustrative examples, control system 121 is located on Earth 108 connected to network 112 in terrestrial portion 106 of communications network 102. Control system 121, when located on Earth 108, may be connected to network 112. In this illustrative example, control system 121 may be implemented using hardware, software, or a combination of the two.

In this example, control system 121 is configured to control the operations of one or more gateways 120. Control system 121 includes a centralized resource controller to control the allocation of resources in gateways 120. Control system 121 also includes centralized control of operation of gateways 120. With the use of control system 121, multiple gateway sites are feasible for gateways 120 and multiple wideband beams are enabled on a single satellite in satellites 110. In other words, the efficiency of an illustrative embodiment allows for greater communications capabilities over a wider range of frequencies.

The common control system 121 allows for centralized resource control database and eliminates the need for synchronizing multiple distributed databases. In other words, the common control system 121 enables cost efficiencies in the implementation of the illustrative embodiment. In these illustrative examples, control system 121 may configure a satellite in satellites 110 with commands based on requests from terminal devices 119 in platforms 122 received over the air through satellite 110 and gateways 120 or from terrestrial users 113 received over network 112.

As depicted, control of satellites 110 by control system 121 may be performed using control information 134. Control information 134 may be sent to satellites 110 through signals 116. Alternatively, control information 134 may be sent to satellites 110 by any other means that provide a desired level of security for the transmission of control information 134 in these illustrative examples. As an example, if gateways 120 include antennas in sanctuary locations, control information 134 may be sent in an alternative frequency band without frequency hopping.

In these illustrative examples, sanctuary locations may be locations with a desired standoff distance from potential jammers. In other words, a sanctuary location may be a location in which a jammer cannot physically approach the sanctuary location to jam signal 123 as signal 123 is transmitted to a destination location. In other illustrative examples, sanctuary locations may be selected based on the level of security present in that location. For example, with military communications, sanctuary locations may be remote locations within allied countries. Of course, sanctuary locations may be other suitable locations, depending on the particular implementation. Thus, if antennas transmitting control information 134 are in sanctuary locations where interference 125 cannot occur, hopping and dehopping of signal 123 with control information 134 may not occur.

In one illustrative example, control system 121 may be configured to control the operation of satellites 110 by sending control information 134 in signals 116. Control system 121 may send a command in control information 134 to position an antenna on one of satellites 110. In this instance, control system 121 may send a command in control information 134 in response to requests from terminal devices 119 received over the air through satellites 110 and gateways 120. In another illustrative example, control system 121 may send a command in control information 134 in response to requests from terrestrial users 113 received over network 112.

In these depicted examples, the use of an illustrative embodiment allows for the transmission of control information 134 in a manner that may be less likely to be jammed by interference 125 when sent using frequency hopping signal 124. Further, processing of control information 134 may occur in terrestrial portion 106 of communication network 102.

Thus, with the use of an illustrative embodiment to process signals 116, at least one of the size, weight, complexity, and cost of satellites 110 may be reduced by performing dehopping and rehopping of signals 116 at locations other than satellites 110.

Figure 2:
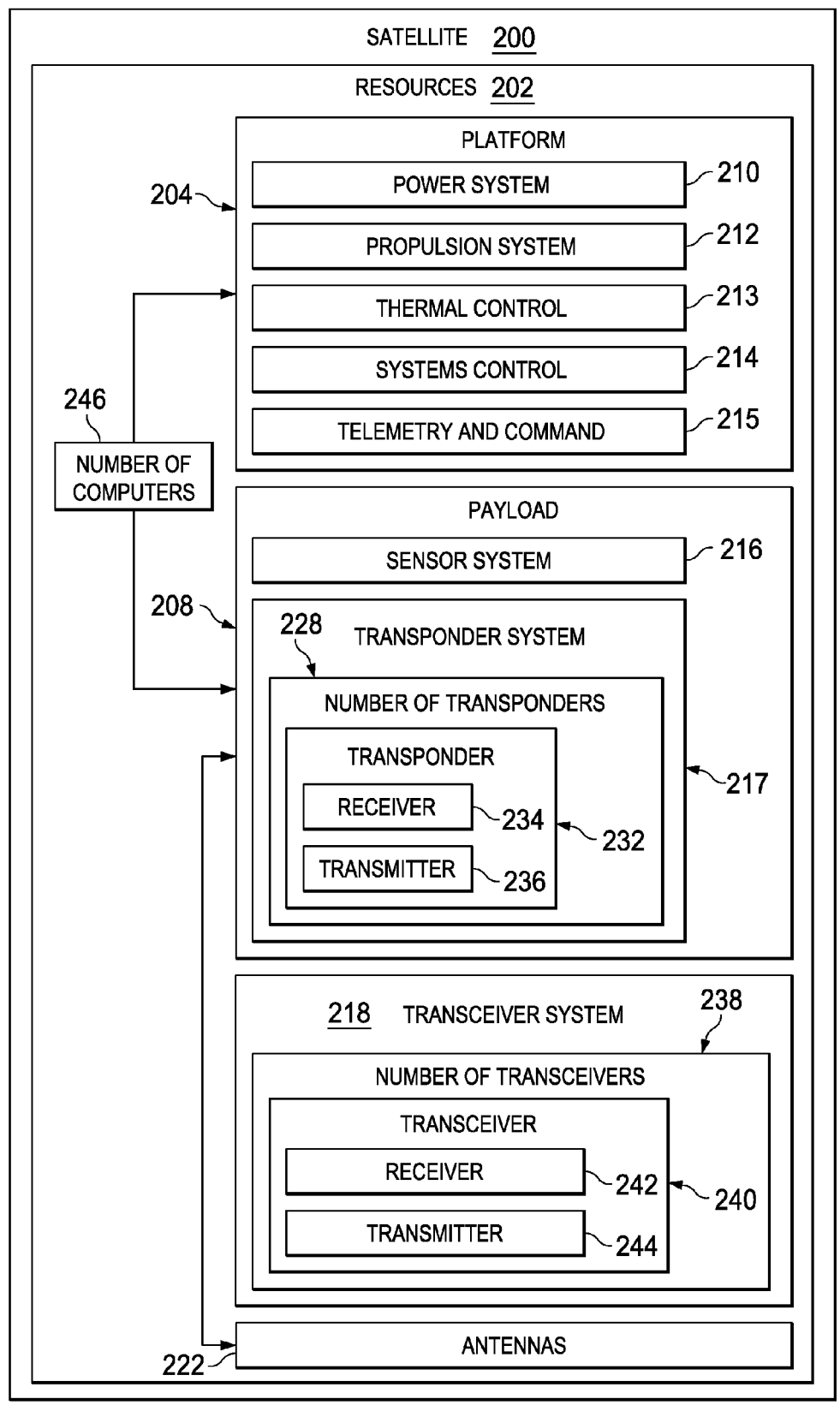
FIG. 2 is an illustration of a block diagram of resources in a satellite in accordance with an illustrative embodiment.

Turning next to FIG. 2, an illustration of a block diagram of resources in a satellite is depicted in accordance with an illustrative embodiment. Satellite 200 is an example of an implementation for a satellite in satellites 110 in FIG. 1.

Resources 202 in satellite 200 are divided between platform 204 and payload 208. As depicted, platform 204 may include power system 210, propulsion system 212, thermal control 213, systems control 214, telemetry and command 215, and other suitable components. Payload 208 may include sensor system 216, transponder system 217, transceiver system 218, antennas 222, and other suitable components.

Power system 210 provides power to operate components within satellite 200. Propulsion system 212 is configured to make changes in the orientation or position of satellite 200.

Thermal control 213 is configured to control the temperature of different components in satellite 200. Thermal control 213 may cool, heat, or heat and cool components, depending on the particular component.

Systems control 214 provides attitude control and coordination between all the systems in satellite 200. Telemetry and command 215 is configured to monitor and direct other systems in satellite 200. Telemetry and command 215 may identify the status of these systems.

In payload 208, sensor system 216 may be implemented with different types of sensors configured to gather data. For example, sensor system 216 may include a telescope, a camera, and other suitable types of sensors.

As depicted, transponder system 217 is connected to antennas 222. Transponder system 217 includes number of transponders 228. Transponder 232 in number of transponders 228 is configured to send a signal in response to receiving a signal in these illustrative examples. Transponder 232 includes receiver 234 and transmitter 236. In these illustrative examples, transponder 232 is configured to receive signals over a range of frequencies and retransmit those signals over the same or different range of frequencies to another location.

In these examples, receiver 234 is configured to receive signals from antennas 222 while transmitter 236 is configured to transmit these signals over antennas 222. The transmission and reception of signals may occur over one or more of antennas 222 in these illustrative examples.

Transceiver system 218 is comprised of number of transceivers 238. In this example, transceiver 240 in number of transceivers 238 is comprised of receiver 242 and transmitter 244. Receiver 242 may receive signals while transmitter 244 transmits signals. The transmission of signals is not necessarily generated in response to the reception of signals by transceiver 240 in these illustrative examples. In these examples, receiver 242 is configured to receive signals from antennas 222 while transmitter 244 is configured to transmit these signals over antennas 222. The transmission and reception of signals may occur over one or more of antennas 222 in these illustrative examples.

As depicted, receiver 234 in transponder 232 in satellite 200 is configured to receive signal 123 having range of frequencies 129 in which information 114 is carried in channel 128 having number of frequencies 126 within range of frequencies 129 in FIG. 1. Transmitter 236 in transponder 232 in satellite 200 is configured to transmit signal 123 to a remote location. Transmitter 236 is configured to transmit signal 123 when signal 123 is unprocessed to identify channel 128 used to carry information 114 by satellite 200. In other words, when signal 123 is a wideband frequency hopping signal, signal 123, may not be narrowband filtered before transmitter 236 re-transmits signal 123.

In a similar fashion, signal 123, when received by receiver 242 in transceiver 240 in satellite 200, is not dehopped. Signal 123 also is not rehopped when retransmitted by transmitter 244 in transceiver 240 in these illustrative examples.

In this example, number of computers 246 is configured to receive commands and send data in information 114. Number of computers 246 may be located in platform 204, payload 208, or both platform 204 and payload 208.

In some illustrative examples, satellite 200 may also include a beacon generator coupled to the transmitter. The beacon generator may generate a beacon signal that is multiplexed with signal 123 for transmission by transmitter 236. This signal includes beacon information, which may be used for a variety of purposes in these illustrative examples. For example, the beacon information in the beacon signal may be used for synchronization, security, and other suitable purposes. In particular, the beacon signal can be detected by multiple ground stations 118 so that the relative distance between the satellite and the various ground stations can be determined. In this way the ground stations can adjust their local time base so that terminals 119 synchronized by different ground stations 118 arrive at the satellite 110 at the same time. This ensures that frequency hopped signals 124 generated by terminals 119 do not interfere with each other.

In other words, dehopping and rehopping is not performed by the components in satellite 200 or payload 208 in these illustrative examples. For example, satellite 200 does not perform dehopping or rehopping when receiving and transmitting signals. Without performing these functions, the amount of resources that may be used in satellite 200 may be reduced.

In some illustrative examples, a portion of signal processing may still occur onboard satellite 200. For example, dehopping of signal 123 may be performed onboard satellite 200, but not other signal processing functions such as depermuting, demodulation, decoding, switching and routing, or other signal processing functions. Dehopping the signals onboard the satellite 110 may enable use of less frequency spectrum for the transmission of information 114 between the satellites 110 and the ground system 118. Dehopping on the satellite 110 may furthermore improve the link efficiency and the anti-jam communications performance of the system.

In this case a beacon signal may be transmitted by the satellite 110 to enable the ground station 118 to accurately range the satellite 110 in order to synchronize the time base used on the satellite 110 for hopping and with the time base used in the ground station 118 and the terminals 119 for hopping.

Further, satellite 200 may also perform a digital channelizing function onboard satellite 200 before signal 123 is transmitted to a destination location in these illustrative examples. In this case, satellite 200 may very efficiently pack the frequency spectrum utilized between the satellite 200 and ground station 118. The digital channelization function after dehop furthermore allows the gain and/or transmit power in the satellite 200 for each dehopped signal to be individually controlled. The channelizer may control gain and/or transmit power for each individual frequency hop and/or channel. This minimizes or eliminates the effect of strong signals or interference or jamming robbing power from weaker signals in the satellite transmitter. In this case, the components needed to perform dehopping, or both dehopping and channelizing do not add as much weight and complexity to satellite 200 as compared to performing more complex processing or full processing of signal 123 on satellite 200.

In other words, with the use of an illustrative embodiment, satellite 200 can function by sending and receiving signals without performing dehopping and hopping, or by sending and receiving signals with dehopping, or with dehopping and channelizing, depending on the particular implementation. Further, number of computers 246 may process commands to cause operations to be performed using different resources in at least one of platform 204 and payload 208. In this manner, a desired level of processing of signal 123 may be completed using components in communications network 102 in FIG. 1.

In some illustrative examples, transponder system 217 may also include at least one second transmitter to transmit a second wideband frequency hopping signal to a non-orbital receiver or to a second non-orbital receiver concurrently with transmitter 236 retransmitting signal 123 to the non-orbital receiver. For example, transmitter 236 may transmit signal 123 using a first polarization received from one coverage area, the second transmitter may transmit the second wideband frequency hopping signal received from a second coverage area, using a second polarization that is orthogonal to the first polarization. When a component is orthogonal to another component, the two components are perpendicular to one another.

Signal 123 and the second wideband frequency hopping signal may be power balanced. Signal 123 and the second wideband frequency hopping signal additionally may occupy orthogonal frequency hopping channels.

Thus, satellite 200 and ground station 118 may enable anti-jam protected communication from multiple coverage areas serviced by satellite 200. Receiver 234 and transmitter 236 may be components of a relatively simple, low cost transponder, such as transponder 232. For example, satellite 200 may be a commercial satellite and transponder 232 may be hosted onboard the commercial satellite. Transponder 232 may enable wideband frequency hopping communication in multiple frequency bands, such as a Ka band and an extremely high frequency (EHF) band.

Figure 3:
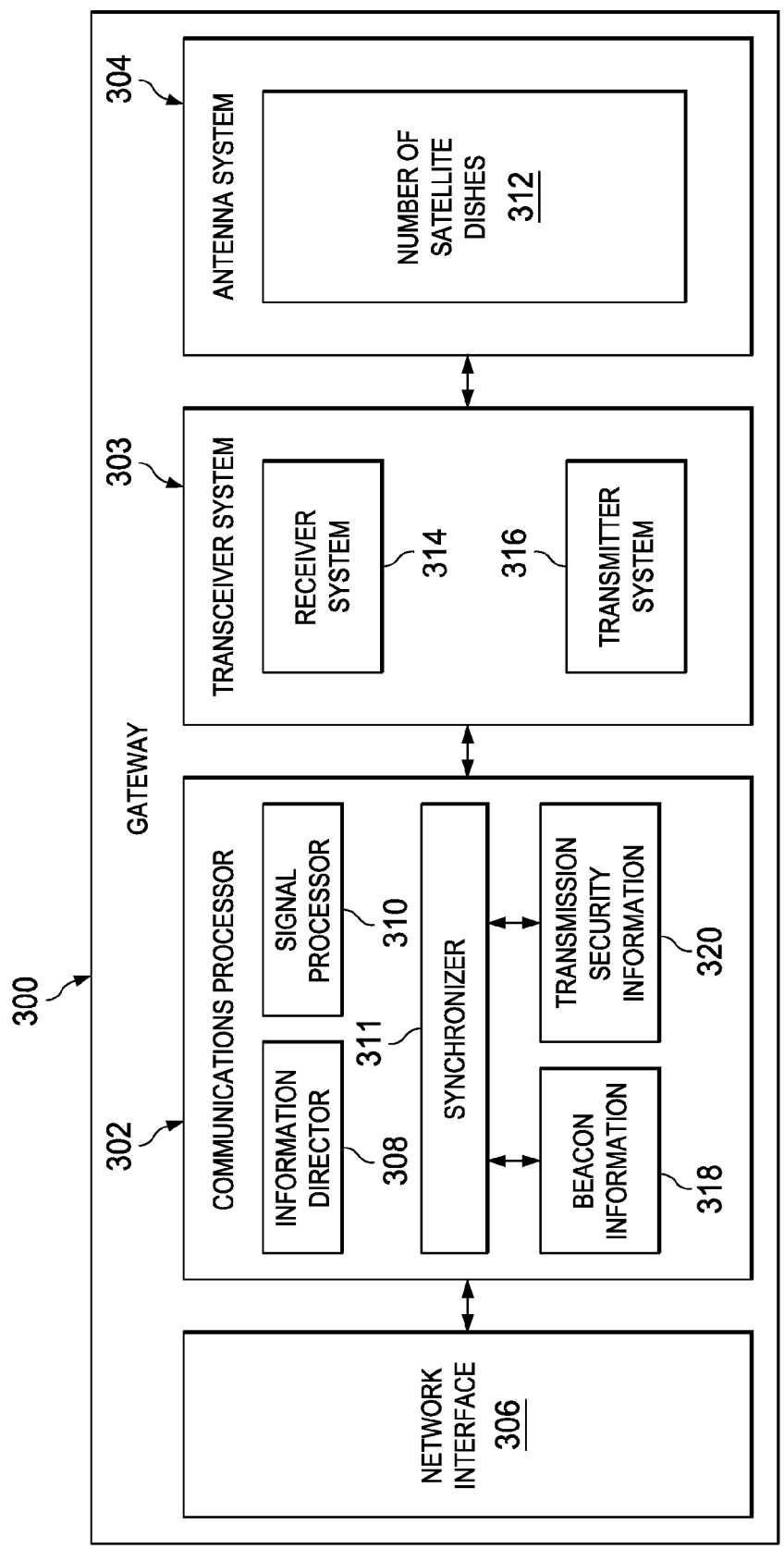
FIG. 3 is an illustration of a block diagram of a gateway in accordance with an illustrative embodiment.

Turning now to FIG. 3, an illustration of a block diagram of a gateway is depicted in accordance with an illustrative embodiment. Gateway 300 is an example of a gateway that may be located in gateways 120 in FIG. 1. In this illustrative example, gateway 300 includes communications processor 302, transceiver system 303, antenna system 304, and network interface 306.

Communications processor 302 is hardware and may include software. Communications processor 302 includes information director 308, signal processor 310, and synchronizer 311. As depicted, communications processor 302 is configured to manage and process information received through gateway 300. This information may be received through at least one of antenna system 304 and network interface 306.

Information director 308 in communications processor 302 is configured to control the flow of information between antenna system 304 and network interface 306. As depicted, information director 308 may be a router, a switch, or other suitable types of devices for controlling information flow.

In these illustrative examples, information director 308 may direct information received from terminals 119 through antenna system 304 to different destination terminals 119 using antenna system 304 or terrestrial users 113 using network interface 306. In a similar fashion, information received from terrestrial users 113 through network interface 306 may be directed to different terminals 119 through antenna system 304 by reconfiguring or selecting number of satellite dishes 312. Transceiver system 303 transmits the information in signals over number of satellite dishes 312.

In this illustrative example, signal processor 310 is located in communications processor 302 and is configured to process signals. As depicted, signal processor 310 may be configured to perform hopping and dehopping of signals with respect to signals received by transceiver system 303 or transmitted by transceiver system 303 through antenna system 304.

In other illustrative examples, signal processor 310 may also use beacon information 318 to synchronize gateway 300 with one or more additional gateways in gateways 120, or to synchronize gateway 300 with one or more satellites in satellites 110, for auto-tracking, or for a combination thereof. In the case where the satellites 110 are not hopping, the beacon is used to synchronize gateway 300 with one or more additional gateways in gateways 120 to ensure that terminals 119 synchronized to different gateways 120 are synchronized when they reach the satellite and do not interfere with each other. In the case where the satellites 110 are hopping, the beacon is used to track the range of satellites 110 and synchronize the hopping of satellites 110 with the gateway 300.

In particular, the dehopping of the satellite return uplink must be advanced synchronously relative to the processing at the gateway of the same signal. Similarly the hopping of the satellite forward downlink must be retarded synchronously relative to the processing at the gateway of the same signal. In both cases, synchronization is maintained in the presence of satellite motion by aid of the beacon signal. In both cases, furthermore, gateway 300 may include or be coupled to an antenna autotracking system. The antenna autotracking system may use beacon information 318 or information derived from a beacon signal to track the satellite-based transmitter. The beacon information may include a pseudorandom noise code such as pseudorandom sequence 130, a ranging sequence, other information, or a combination thereof.

As depicted, transceiver system 303 is configured to receive and send signals through antenna system 304. In particular, transceiver system 303 may send received signals using number of satellite dishes 312. In this example, transceiver system 303 is comprised of receiver system 314 and transmitter system 316. A transceiver may include one or more receivers in receiver system 314 and one or more transmitters in transmitter system 316.

In these illustrative examples, signal processor 310 may be configured to generate signal 123 with range of frequencies 129 in which carrier waves 127 carries information 114 and has number of frequencies 126 in channel 128 such that number of frequencies 126 in FIG. 1 changes over time. In these illustrative examples, signal 123 may be a wideband frequency hopping signal. This wideband frequency hopping signal may be transmitted using antenna system 304.

Further, signal processor 310 also may receive a frequency hopping signal and identify the information in the frequency hopping signal. In other words, gateway 300 also may perform dehopping. The dehopping signal may form a processed signal which is then transmitted to one of terrestrial users 113 through network interface 306. In this case, frequency hopping may not be performed on the processed signal. In other illustrative examples, the information may be placed into another frequency hopping signal and retransmitted over antenna system 304 to platforms 122 and terminal devices 119 via satellites 110.

In this illustrative example, the signal generated or processed by signal processor 310 may take various forms. For example, signal processor 310 may handle an extended data rate (XDR) waveform as well as other types of waveforms in generating and receiving signals. Signal processor 310 may include other signal processing functions in addition to the hopping and dehopping functions. When signals are received by gateway 300, signal processor 310 may perform depermutation, demodulation, deinterleaving, decoding, decryption of orderwires or communications information, deframing, descrambling, despreading, interference mitigation, geolocation, adaptive nulling, or other suitable signal processing functions.

In other illustrative examples, signal processor 310 in gateway 300 may perform time-sensitive time synchronization acquisition and tracking processing. An "orderwire message" may be a message that is exchanged among terminals 119 and the resource control system 408 in the control system 400 for the purpose of allocating system resources, such as satellite antennas 222 and time and frequency allocations for communication circuits, synchronization probes, and orderwire messages, and other system resources. When signals are transmitted by gateway 300, signal processor 310 may perform permutation, modulation, interleaving, coding, encryption of orderwires or communications information, framing, scrambling, spreading, spectral suppression, or other suitable signal processing functions.

Further, the extended data rate waveform, or any other waveform, may be fully processed by signal processor 310 to include more efficient types of demodulation and decoding. For example, signal processor 310 may perform soft-decision demodulation and decoding. Soft-decision processing may be desirable because soft-decision processing requires less signal-to-noise ratio than other types of decoding. With the use of less signal-to-noise ratio through soft-decision processing, data rate may be increased compared to performing hard-decision demodulation onboard satellite 200 in FIG. 2. As a result, performance of communications network 102 may be enhanced with the use of signal processor 310 in gateway 300 instead of a signal processor onboard satellite 200.

Network interface 306 may be an interface to a network such as network 112 in FIG. 1. Network interface 306 may be an interface to a ground based wired network, a wireless network, an optical network, a synchronous optical network (SONET), or some other suitable type of network. Of course, the signal may be transmitted using various protocols such as an internet protocol or other type of digital communications protocol. In these illustrative examples, gateway 300 may use network interface 306 to transmit content of the processed signal to a terrestrial device 113.

By including network interface 306 in gateway 300, communications network 102 enables platforms 122 with terminal devices 119 to connect to terrestrial users 113 through network 112 without requiring terrestrial users 113 to have terminal devices 119 to connect to satellites 110. In other words, communications between platforms 122 and terrestrial users 113 may be sent through network 112 such that terrestrial users 113 do not need capabilities to transmit information to satellites 110.

In these illustrative examples, network interface 306 may be implemented using a number of different devices. For example, network interface 306 may be implemented using one or more network interface cards.

Synchronizer 311 in communications processor 302 may perform a number of different functions. In these illustrative examples, communications processor 302 with synchronizer 311 may be configured to perform synchronization functions with the use of information from control system 121 in FIG. 1.

In these illustrative examples, synchronizer 311 may perform different types of synchronization functions for gateway 300. For example, synchronizer 311 may be used to calculate ranging measurements based on the time it takes for a signal to reach a satellite and be transmitted back to gateway 300.

These ranging measurements may be stored in a database and/or may be sent to control system 121 in FIG. 1 for further processing. Once control system 121 receives ranging measurements from gateway 300 and the other gateways in communications environment 100, control system 121 may send instructions to synchronizer 311 to adjust its relative time.

The adjustment of the time to be synchronized between gateways 120 as well as other components such as satellites 110 and terminal devices 119 in communications network 102 may be used in hopping and dehopping signals 116. Pseudorandom sequence 130 may be used to select a frequency for carrier wave 127 in signals 116. If the time is not correct, then at some point in time the particular frequency selected by one gateway in gateways 120 may be different from other gateways in gateways 120. As a result, carrier waves 127 containing information 114 from different terminals synchronized to different gateways 120 may interfere with each other at satellite 200. The various signals cannot be guaranteed to be hopping on orthogonal frequencies without an accurate synchronization of time between the different components in communications environment 100.

In these illustrative examples, these synchronization processes and other types of synchronization processes may be performed using beacon information 318 generated and broadcast by satellites 110. Beacon information 318 broadcast by satellites 110 may contain a pattern used for identification. The time of arrival of beacon information 318 may be recorded locally by each of gateways 120 and compared to a common local calibrated time standard. This common local calibrated time standard may be Coordinated Universal Time (UTC) or other suitable time standards.

In these depicted examples, control system 121 collects times from each of gateways 120 to determine the distance from a satellite in satellites 110 to each gateway in gateways 120. Control system 121 then sends commands to each of gateways 120 to synchronize gateways 120.

In this manner, relative range between gateways in gateways 120 can be determined without reliance on any uplink transmissions from any of gateways 120 which may be subject to interference 125. In other words, relative timing between gateways 120 can be determined without the need for each of gateways 120 to send an uplink to satellites 110.

With the use of beacon information 318, gateways 120 may be synchronized in these illustrative examples such that the flight time of signals 116 is the same for each of gateways 120. In particular, synchronizer 311 may synchronize gateway 300 with other gateways 120 in communications network 102. In other illustrative examples, such as in the case where the satellites 110 are hopping, the beacon is used to track the range of satellites 110 and synchronize the hopping of satellites 110 with the gateway 300. In particular the dehopping of the satellite return uplink must be advanced synchronously relative to the processing at the gateway of the same signal. Similarly the hopping of the satellite forward downlink must be retarded synchronously relative to the processing at the gateway of the same signal. In both cases, synchronization is maintained in the presence of satellite motion by aid of the beacon signal.

In other illustrative examples, synchronizer 311 may adjust the time in gateway 300 based on information received from satellites 110 without receiving commands from control system 121. In other words, synchronizer 311 may synchronize gateway 300 based on relative time calculated by gateway 300 or commands received from control system 121 in these illustrative examples.

Gateway 300 may additionally fully process the extended data rate (XDR) waveform, including forward error-correction encoding and decoding, and channel interleaving and de-interleaving, in addition to modulation and demodulation customarily performed at an XDR switch.

Gateway 300 may additionally, or in the alternative, host other anti-jam waveforms with enhanced waveform features such as bandwidth-on-demand, adaptive coding and modulation, bandwidth efficient modulation, beam handover, label switching, packet switching, resilience to blockage environment, some other suitable processes, or some combination thereof.

Transmitter system 316 may include a transmitter to transmit content of the processed signal to terminals 119 in multiple coverage areas under satellites 110. For example, the transmitter of gateway 300 may be configured to wideband frequency hop signals for one coverage area under satellite 200 using one orthogonal polarization while and to simultaneously wideband frequency hop a second wideband frequency hopping signal for terminals 119 a second coverage area under satellite 200.

Thus, gateway 300 enables anti-jam protected communication using relatively low cost satellite-based transponders to relay wideband frequency hopping signals. In this manner, satellite 200 may be less complex and costly and may utilize fewer resources 202 in FIG. 2 than when processing is performed onboard satellite 200. As a result, communications network 102 will also be less costly. Additionally, by performing the full-processing in a cost-effective manner in the gateway 300 and other gateways in gateways 120 in FIG. 1, communications performance is significantly improved relative to some currently used systems in which only partial processing is performed prior to switching. The wideband frequency hopping signals may be fully processed by gateway 300 rather than onboard the satellite reducing cost and lead time associated with providing satellite-based systems to dehop and fully process the wideband frequency hopping signals.

Figure 4:
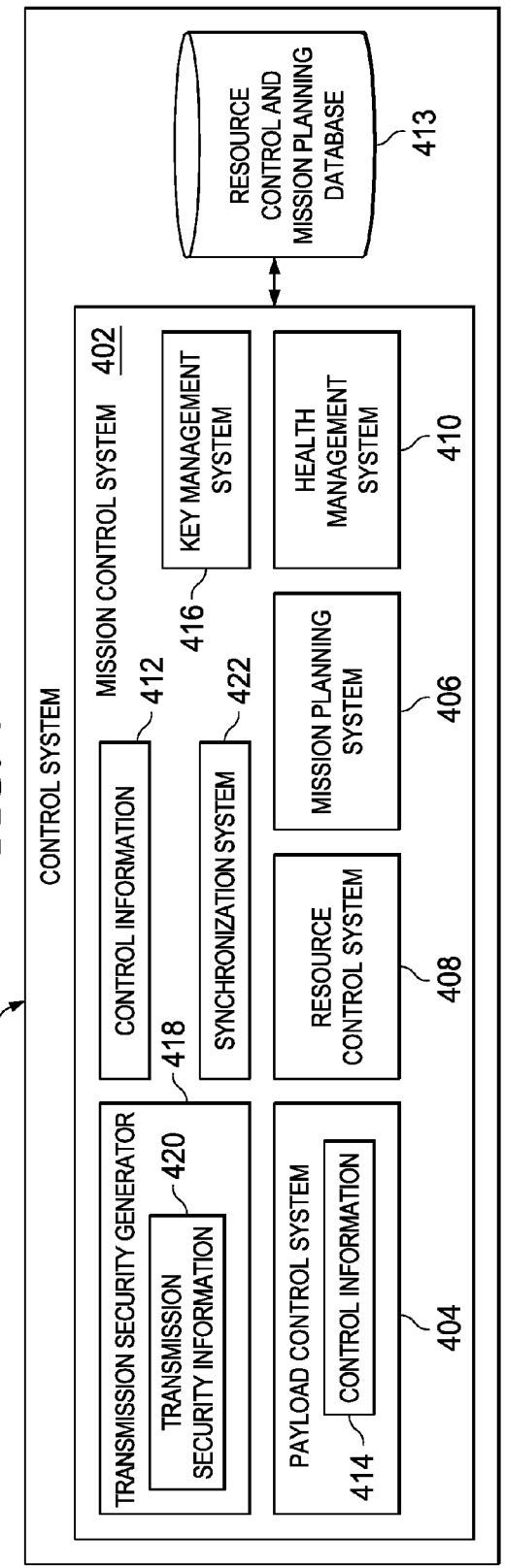
FIG. 4 is an illustration of a block diagram of a control system in accordance with an illustrative embodiment.

Turning now to FIG. 4, an illustration of a block diagram of a control system is depicted in accordance with an illustrative embodiment. In this depicted example, control system 400 is an example of a control system that may be used to implement control system 121 in FIG. 1.

In these illustrative examples, control system 400 includes a number of different components. As depicted, control system 400 includes mission control system 402 and the resource control and mission planning database 413. The mission control system 402 is comprised of payload control system 404, mission planning system 406, resource control system 408, health management system 410, key management system 416, transmission security generator 418, and synchronization system 422.

Mission control system 402 is configured to generate control information 412. In these illustrative examples, control information 412 may be configuration information and may include commands, data, key material such as transmission security information or encryption keys, and other suitable information for controlling gateways 120 and one or more satellites 110 in FIG. 1. In some examples, control information 412 may include configuration information required by the terminal devices 119 to ensure compatible communications across communications network 102 in FIG. 1.

In this manner, mission control system 402 provides a centralized control of satellites 110 that may be operated by different entities. Mission control system 402 is responsible for the control functions for communications network 102 which may include control of at least one of platforms 122, the payload 208, gateways 300, terminals 119, terrestrial users 113, the network 112, and other suitable components.

Mission planning system 406 may be configured to set aside resources within communications network 102 for use by terminal devices 119. For example, mission planning system 406 may make sure that sufficient communications resources are present for desired performance of communications network 102 for the particular needs of a user.

In one illustrative example, a user may require knowledge of system broadcast, acquisition, and logon resources, and may require knowledge of network compatible keys. The user may also require a desired number of bits-per-second, a number of terminals devices with desired features, and other parameters for desired performance of communications network 102. With the identification of the desired number of bits-per-second and number of terminal devices with desired features as well as other parameters, mission planning system 406 may select terminal devices 119, gateways 120, satellites 110, antennas 222, as well as other resources for transmitting information 114 as desired, such as time and frequency slots for communications, synchronization, and orderwire messaging, as well as other resources. In other words, mission planning system 406 may plan communications network 102 and resources such that the desired connectivity, functionality, and level of performance are achieved.

Resource control system 408 may activate resources in gateway 300 to send signal 123 or signals 116 to satellites 110 in FIG. 1. For example, resource control system 408 may allocate transceivers within transceiver system 303 and satellite dishes in number of satellite dishes 312 to send signal 123 or signals 116 to satellites 110. Resource control system 408 may process order wire messages between terminals 119 and gateway 300 in order to activate system resources, such as satellite antennas 222 and time and frequency allocations for communication circuits, synchronization probes, and orderwire messages, and other system resources. Resource control system 408 may be implemented using hardware, software, or a combination thereof.

In this illustrative example, resource control system 408 may control resources for the entire fleet of satellites 110 and associated gateways 120. In this manner, resource control system 408 provides centralized control for network resources, satellite resources, and gateways resources for communications network 102. Thus, the design of communications network 102 is streamlined and costs are reduced relative to a communications network with a distributed database which requires another layer of communication in order to maintain synchronization between components in the distributed databases.

Additionally, resource control system 408 processes messages received from and destined to terminals 119 serviced by the entire constellation of satellites 110 and gateways 120. Processing may include authentication, parsing, formatting, encrypting, decrypting, and other suitable processing of inbound and outbound orderwire messages.

In other words, mission planning system 406, resource control system 408, or both may be configured to control reservation of satellite communication resources and activation of the satellite communication resources. Resource control system 408 and mission planning system 406 may communicate with at least one gateway in gateways 120 in FIG. 1. Resource control system 408 and mission planning system 406 may be centralized and remotely located from gateways 120.

A centralized resource control system 408 and mission planning system 406 may be used to manage a plurality of satellite transponder systems. In this example, a first transponder is associated with a first gateway device in gateways 120 and a second transponder is associated with a second gateway device in gateways 120. The first gateway device and the second gateway device do not communicate directly with one another via a satellite crosslink or terrestrial means to coordinate resource control and mission planning.

In another illustrative example, resource control system 408 may activate, upon receipt of a validated orderwire message, resources which have been previously identified, allocated, and reserved in mission planning database 413 by mission planning system 406. Resource control and mission planning database 413 may store resource control and mission planning information related to a plurality of satellite transponder systems that facilitate communications between the one or more of terminal devices 119.

In these illustrative examples, mission control system 402 may perform mission planning and resource control using a common resource control and mission planning database 413. Resource control and mission planning database 413 identifies resources in communications network 102 in FIG. 1 that have been allocated for various uses. For example, resource control and mission planning database 413 may identify satellites in satellites 110 and gateways in gateways 120 that have been allocated for use in transmitting information 114 in FIG. 1.

Transmission security information 420 is information used to provide a desired level of security for communications network 102 in these illustrative examples. Transmission security information 420 is information that may be generated at transmission security generator 418 and distributed to gateways 120. For example, transmission security information 420 may include, for example, without limitation, keys that are used for hopping, permuting, rotation, cover, and other cryptographic functions. This function may also encrypt and decrypt secure orderwire messaging.

In this depicted example, transmission security generator 418 is an example of transmission security generator 132 depicted in FIG. 1. Transmission security generator 418 is a transmission security device that is certified and engineered from a trusted source. This trusted source may be the government, a security agency, or some other suitable source.

In these illustrative examples, control system 400 may transmit transmission security information 420 to gateways 120. Transmission security information 420 may be used to provide a desired level of security for the communication of information 114. This desired level of security may involve avoiding interference 125, avoiding unintended parties seeing information 114, and other security parameters. In order to protect transmission security information 420, transmission security information 420 may be relayed by encrypted transmissions such as High Assurance Internet Protocol Encryptor transmission (HAIPE) or other suitable methods. Transmission security information 420 may be encrypted or protected by other suitable methods.

In other illustrative examples, transmission security generator 418 may be implemented in gateways 120 rather than in control system 400. Placing transmission security generator 418 in gateways 120 may be used to expedite receipt of transmission security information 420 by gateways 120 or for other suitable reasons, depending on the particular implementation.

In these illustrative examples, mission control system 402 generates transmission security information 420 used by gateway 300 in FIG. 3. With the generation of transmission security information 420, mission control system 402 may control the level of transmission security used when transmitting signals 116 in communications environment 100 in FIG. 1.

For example, mission control system 402 may provide gateway 300 with a key for hopping and dehopping signal 123 using signal processor 310 in FIG. 3. In these illustrative examples, the key may be pseudorandom sequence 130 in FIG. 1.

Mission control system 402 may also provide an interface between communications network 102 and an outside communications network. For example, a security establishment such as the National Security Agency may provide instructions for generating the key to be used in transmission security information 420. That key is given to mission control system 402 for processing and sending to gateway 300. In other words, mission control system 402 also provides a key management function for communications network 102 in these illustrative examples. The key management function may also manage keys and end cryptographic devices used by the terminals 119 in the communications network 102.

Additionally, mission control system 402 may include a health management system 410. Health management system 410 may monitor the health of control system 400 and other components in communications network 102. Health management system 410 may be configured to automatically perform maintenance of components in communications network 102, to generate alerts to perform maintenance of communications network 102, or some combination thereof, depending on the particular implementation.

Payload control system 404 is configured to generate control information 414. Control information 414 includes information used to control the operations of payload 208 in satellite 200 in FIG. 2.

Payload control system 404 may be used when satellite 200 functions as a host satellite. In this illustrative example, a host satellite may be a commercial satellite with multiple users. When satellite 200 functions as a host satellite, commands for operation of satellite 200 may flow through a commercial operator. In this case, a portion of control information 414 may be sensitive information and a portion of control information 414 may not be sensitive information. Payload control system 404 may add a level of security for the sensitive portion of control information 414.

For example, this sensitive control information 414 may include positioning of antennas 222 on satellite 200. Payload control system 404 secures the antenna pointing commands in control information 414 such that an operator of the host satellite may not be able to identify these antenna pointing commands.

In other words, payload control system 404 may be configured to send control signals in control information 414 to a transponder in a satellite via a gateway device, mission control system 402, or both. The control signals may be used to control at least one of the elements in payload 208. In an illustrative example, the control signals may include transponder gain or level control of transponders 232, or antenna pointing commands used to control the pointing direction of antennas 222 of the transponder in satellite 200.

In these illustrative examples, resource control system 408 may be configured to control resources in communications network 102. For example, a terminal device in terminal devices 119 in FIG. 1 may send an orderwire message asking control system 400 to turn on a particular communication service. As an example, a terminal device in terminal devices 119 may ask control system 400 to set up a point-to-point call. Resource control system 408 may be used by control system 400 to set up this point-to-point call and provide the communications resources necessary for the call.

In another illustrative example, resource control system 408 may send information about the state of communications network 102 to terminal devices 119 within communications network 102. In still other illustrative examples, terminal devices 119 may ask for antennas to be pointed in a particular direction. This message is sent to resource control system 408 and resource control system 408 sends a repointing command to payload control system 404 for communication to satellite 200. In some cases, when satellite 200 is a host satellite, payload control system sends the repointing commands.

Key management system 416 may be configured to send frequency hopping code information, other transmission security information, access control keys, and other pertinent key information to the one or more terminal devices 119. The information sent by key management system 416 may be pseudorandom sequence 130 in FIG. 1. This information may also be transmission security information 320 in FIG. 3. The frequency hopping code information may be used by the one or more terminal devices 119 to determine a frequency hopping pattern of the wideband frequency hopping signals.

Key management system 416 in mission control system 402 is configured to generate information to provide security in the transmission of signals 116. In particular, key management system 416 is configured to generate transmission security information 320 used by gateway 300. For example, key management system 416 may be configured to generate information for frequency hopping. This information may include, for example, a pseudorandom number code such as pseudorandom sequence 130. Additionally, key management system 416 also may generate encryption keys for encrypting information 114, access control keys for terminal devices 119, and other suitable types of information.

Synchronization system 422 may perform a number of different functions. In these illustrative examples, synchronization system 422 may be configured to provide synchronizer 311 in FIG. 3 with information to synchronize gateway 300 and other gateways 120 in FIG. 1. Alternatively, in the case when hopping is performed on the satellite, the synchronization system 422 may be configured to synchronize hopping functions on the satellite 110 with hopping functions at the gateway 120.

With the use of an illustrative embodiment, a centralized control system such as control system 400 allows communications network 102 greater flexibility and lower operational costs than with currently used communications networks. In contrast, with some currently used communications networks, control systems are decentralized such that more complex processing within each satellite occurs. This complex processing increases the cost and complexity of currently used communications networks.

Thus, with the use of an illustrative embodiment, however, control system 400 performs centralized security generation using transmission security generator 418. Control system 400 also contains processing systems that work simultaneously for all of satellites 110. As a result, the centralized control by control system 400 reduces overall system cost because processing and security functions are not needed on each of satellites 110. Instead, control system 400 controls operation of all of satellites 110 in these illustrative examples.

Figure 5:
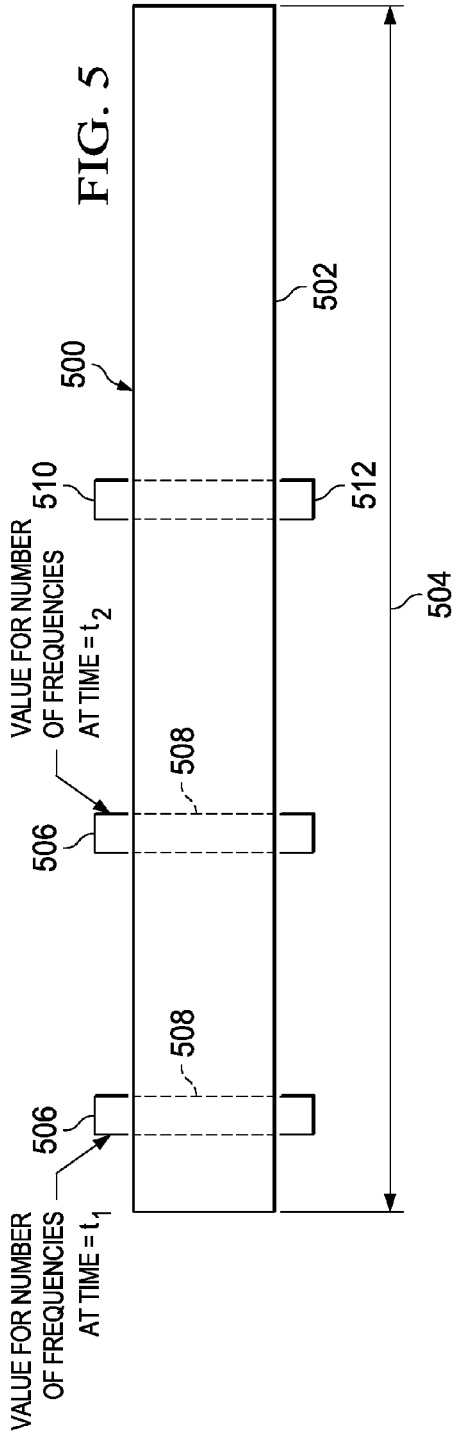
FIG. 5 is an illustration of a signal in accordance with an illustrative embodiment.

Turning now to FIG. 5, an illustration of a signal is depicted in accordance with an illustrative embodiment. In this illustrative example, signal 500 is an illustration of one implementation for signal 123 in FIG. 1.

In this illustrative example, signal 500 may be wideband frequency hopped signal 502. Signal 500 has range of frequencies 504. Range of frequencies 504 is a range of frequencies in which information may be transmitted over time. Range of frequencies 504 may be a continuous range of frequencies or may be discontinuous. In other words, gaps may be present within the frequencies in range of frequencies 504. In these illustrative examples, range of frequencies 504 may be a frequency hopping spread spectrum.

However, only a portion of range of frequencies 504 is used in any one instant of time to transmit information 114 in FIG. 1 in these illustrative examples. For example, a transmitter using the wideband frequency hopping signals in range of frequencies 504 may divide a communication and send portions of the communication over different relatively narrow frequency bands. The order, timing, particular narrow frequency bands used for the communication, or some combination thereof may be determined based on a communication key.

As an example, channel 506 has number of frequencies 508. As depicted, number of frequencies 508 may be continuous or may have gaps for channel 506 in these illustrative examples. Information 114 may be transmitted in channel 506 within range of frequencies 504 of signal 500. In particular, a carrier wave may be used to carry information 114 in which the carrier wave has number of frequencies 508 in channel 506.

As depicted, channel 506 in which information is transmitted may change over time as signal 500 is transmitted. Thus, at different points in time, channel 506 may have different values for number of frequencies 508 in which information 114 is transmitted. Two instants in time are illustrated in FIG. 5.

As number of frequencies 508 changes for channel 506, this change may be referred to as frequency hopping or hopping of channel 506. When frequency hopping or channel hopping occurs, signal 500 is considered to be a frequency hopping signal. This change or hopping of number of frequencies 508 may reduce the possibility of interference with the transmission of information 114.

Additionally, signal 500 also may include beacon information 318 in FIG. 1. This beacon information may be sent in channel 510 which has number of frequencies 512. In these illustrative examples, number of frequencies 512 for channel 510 may not change over time. Instead, beacon information 318 may be transmitted in signal 500 using fixed frequencies. Of course, in other illustrative examples, number of frequencies 512 for channel 510 also may change over time.

In this illustrative example, number of frequencies 508 in channel 506 may be considered to be a narrow band. Number of frequencies 512 in channel 510 also may be considered to be a narrow band. When a number of frequencies are a narrow band, the number of frequencies may have a range of about 1 KHz to 100 MHz depending on the particular implementation. Range of frequencies 504 may be considered to be a wideband range of frequencies. This range of frequencies may have a range that is about 1 GHz wide to about 2 GHz wide. The jam resistance of the transmission is approximately proportional to the ratio of the range of frequencies 504 to the number of frequencies 508 that are a narrow band and comprise the channel 506.

In some illustrative examples, super high frequencies (SHF) or extremely high frequency (EHF) frequencies may be used. These frequencies range from about 3 GHz to about 300 GHz. In particular the 43.5-45.5 GHz and/or 30-31 GHz bands may be used for the return uplink and the 20.2-21.2 GHz band may be used for the forward downlink. Of course, yet other frequency ranges may be used depending on the particular implementation.

Although the frequencies are shown as being contiguous, those frequencies may be discontiguous depending on the functionality involved. In other words, range of frequencies 504 may have gaps in some cases.

Figure 6:
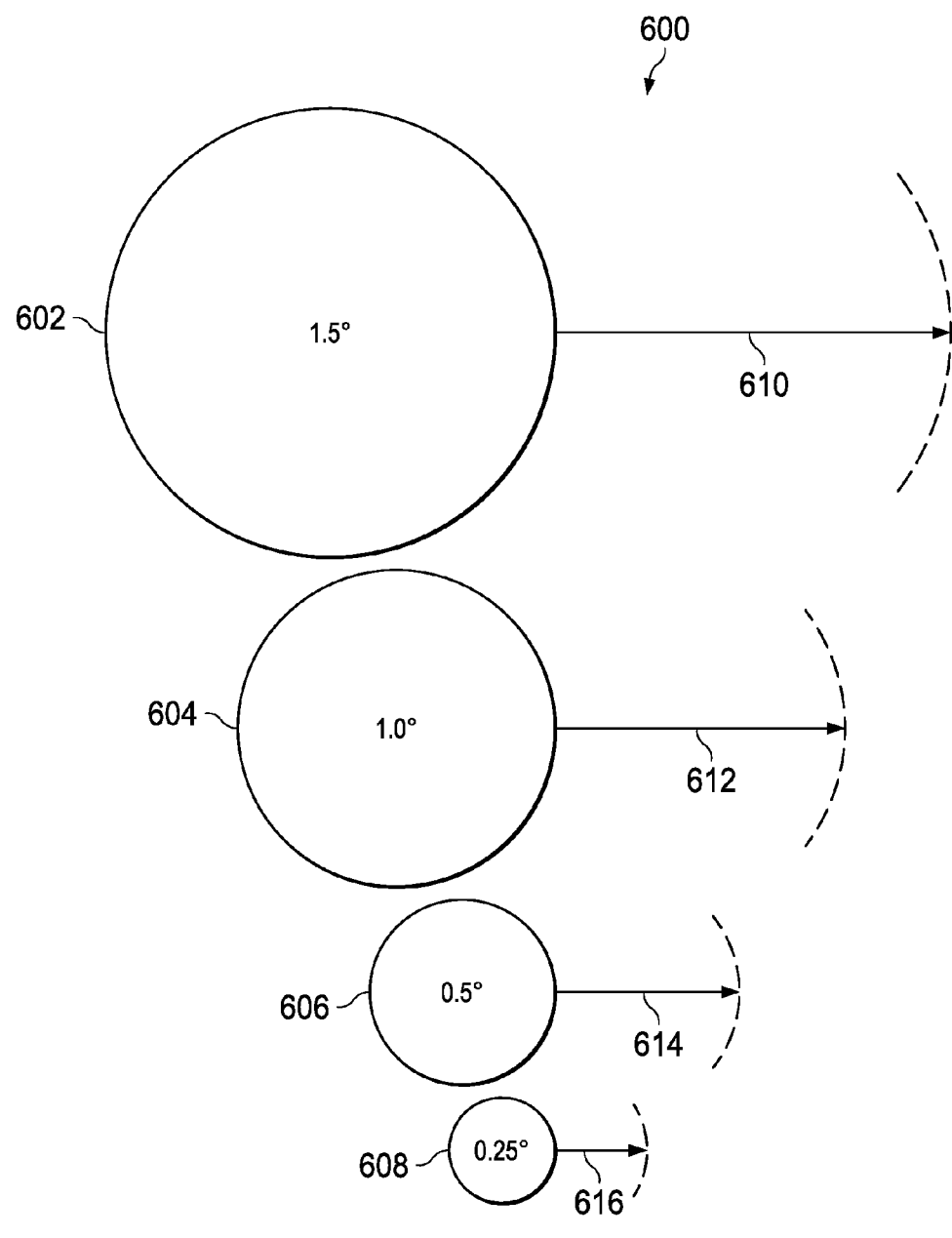
FIG. 6 is an illustration of beam sizes for signals in accordance with an illustrative embodiment.

Turning now to FIG. 6, an illustration of beam sizes for signals is depicted in accordance with an illustrative embodiment. In the different illustrative examples, signals 116 transmitted to and from satellites 110 in FIG. 1 may be transmitted in the form of beams. These beams may have different sizes. In this illustrative example, beam sizes 600 are examples of beam sizes that may be used to send signals to and from satellite 200 in FIG. 2.

In these illustrative examples, beam sizes 600 include first beam size 602, second beam size 604, third beam size 606, and fourth beam size 608. First beam size 602 is about 1.5 degrees. Second beam size 604 is about 1 degree. Third beam size 606 is about 0.5 degrees and fourth beam size 608 is about 0.25 degrees.

As can be seen in this illustrative example, the distance at which a device is able to generate interference to jam signals changes based on the beam size. This distance may be referred to as a standoff distance.

In this illustrative example, first beam size 602 has standoff distance 610. Second beam size 604 has standoff distance 612. Third beam size 606 has standoff distance 614 and fourth beam size 608 has standoff distance 616.

Thus, as the beam size decreases for a beam used to transmit signal 123 in FIG. 1, the standoff distance at which a device may cause interference also decreases. In the different illustrative embodiments, interference with the transmission of signals 116 between satellites 110 and other devices may be reduced by a combination of frequency hopping and a selection of beam sizes. By decreasing the beam size, the ability of a device to cause interference with signals 116 in the beam is made more difficult because of the smaller standoff distance for the device as compared to a larger beam size.

Figure 7:
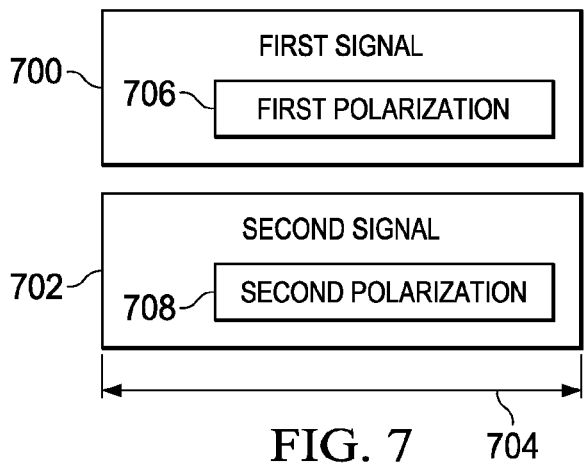
FIG. 7 is an illustration of a block diagram of signals sent in a range of frequencies in accordance with an illustrative embodiment.

Turning now to FIG. 7, an illustration of a block diagram of signals sent in a range of frequencies is depicted in accordance with an illustrative embodiment. As depicted, first signal 700 and second signal 702 are examples of signals 116 in FIG. 1 that may be transmitted by satellite 200 in FIG. 2.

In particular, at least one of first signal 700 and second signal 702 may be wideband frequency hopping signals in these examples. In other words, first signal 700 may be a wideband frequency hopping signal, while second signal 702 is not a wideband frequency hopping signal. In another illustrative example, both first signal 700 and second signal 702 may be wideband frequency hopping signals.

In this depicted example, first signal 700 and second signal 702 are both transmitted using range of frequencies 704. In other words, both signals use the same range of frequencies.

The same range of frequencies may be used through different polarization of first signal 700 and second signal 702. For example, first signal 700 may have first polarization 706, while second signal 702 has second polarization 708.

In these illustrative examples, first signal 700 with first polarization 706 and second signal 702 with second polarization 708 may be power balanced. As depicted, first signal 700 may have a higher data rate than second signal 702. In this case, first signal 700 may use more power than second signal 702. In order to prevent first signal 700 from interfering excessively with second signal 702, and to prevent second signal 702 from interfering excessively with first signal 700, when the two signals are transmitted substantially concurrently, the two signals are power balanced in these illustrative examples. In other words, devices are in place in the communications network that ensure that first signal 700 and second signal 702 receive the appropriate level of power for desired transmission of these signals.

Further, first signal 700 with first polarization 706 and second signal 702 with second polarization 708 may use orthogonal frequency channels that are synchronously frequency hopped. In other words, first signal 700 and second signal 702 may be frequency hopped at the same time using pseudorandom sequence 130 in FIG. 1.

Further, first signal 700 with first polarization 706 and second signal 702 with second polarization 708 may be synchronously hopped wideband frequency hopping signals, which instantaneously hop to different number of frequencies 508 within the common range of frequencies 504. In this way, interference between the first signal 700 on the first polarization 706 and the second signal 702 on the second polarization 708 is minimized.

Figure 8:
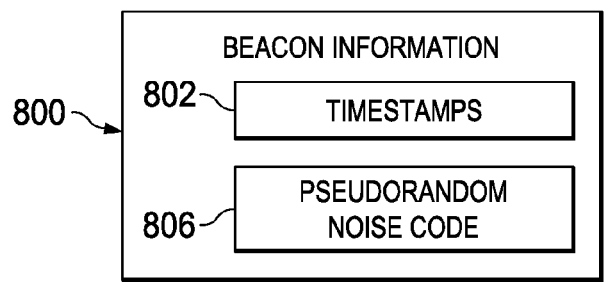
FIG. 8 is an illustration of a block diagram of beacon information in accordance with an illustrative embodiment.

With reference now to FIG. 8, an illustration of a block diagram of beacon information is depicted in accordance with an illustrative embodiment. In this depicted example, beacon information 800 is an example of beacon information 318 that may be transmitted in a beacon signal that may be part of signal 123 transmitted by satellite 110 in FIG. 1.

As an example, a gateway in gateways 120 may include a receiver to receive a beacon signal from a satellite-based transmitter. In these illustrative examples, the beacon signal may be multiplexed or integrated as part of signal 123. The return downlink may include two or more signals with different polarizations. The return downlink signal may be a wideband frequency hopping signal of the satellite-based transmitter.

As depicted, beacon information 800 may be sent to various components in communications network 102 in FIG. 1. For example, beacon information 800 may be sent to gateways 120, terminal devices 119, and other suitable components in FIG. 1. In particular, the beacon signal may be multiplexed or integrated as part of signal 123 in these illustrative examples.

As depicted, beacon information 800 may include a number of different types of information. For example, beacon information 800 may include pseudorandom noise code 806, timestamps 802, and other suitable types of information. Beacon information 800 is used to aid in accomplishing at least one of autotracking a location of a satellite transmitting the beacon information by the antenna of terminal 119 or gateway 120, maintenance of satellite master oscillator frequency syntonization by the control system 121, synchronizing the gateway with other gateways and, in the case of a frequency hopped satellite, synchronizing the gateways with the satellite.

Pseudorandom noise code 806 transmitted by satellites 110 may be used to synchronize gateways 120 to each other. The difference in time at which the pseudorandom noise code 806 is received at several gateways 120 may be used to determine the relative delay between the satellite 110 and the several gateways 120. With this information the hopping time bases of the various gateways 120 may be adjusted so that hopping signals synchronized to the various gateways 120 are synchronized upon arrival at the satellite 110. In this way all wideband hopping signals from the various gateways 120 and from terminals 119 synchronized to the various gateways 120 are synchronized at the satellite so that they do not interfere with each other.

In the case of frequency hopped satellites, timestamps 802 transmitted by the satellite 110, together with the pseudorandom noise code 806, may be further used to synchronize the frequency hopping satellite 110 with the frequency hopping gateways 120. The time at which the information is received by the gateways 120 may be compared to the time stamp inserted by the satellite 110 in order to determine whether the satellite time base is early or late. In this manner, the satellite time base may be adjusted to synchronize the satellite with the gateway. Utilizing these satellite transmissions, all wideband hopping signals from the various gateways 120 and from terminals 119 synchronized to the various gateways 120 are synchronized at the satellite so that they do not interfere with each other. All wideband hopping signals associated with all gateway devices processing signals from transponders with overlapping fields of view on a common satellite are synchronized at the satellite to avoid frequency interference and to maintain frequency hopping orthogonality of the signals on those transponders.

Figure 9:
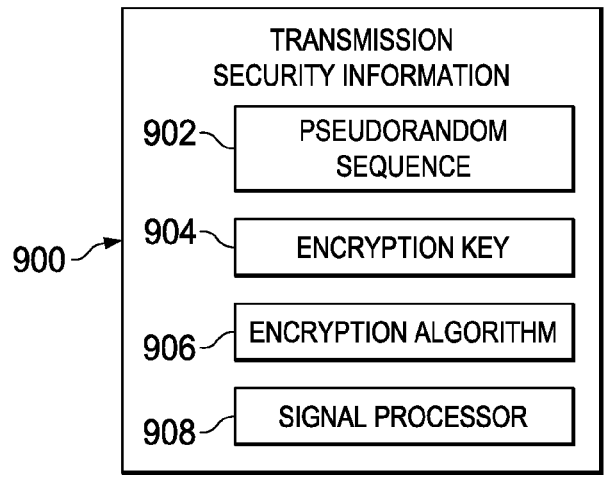
FIG. 9 is an illustration of a block diagram of security information in accordance with an illustrative embodiment.

Turning now to FIG. 9, an illustration of a block diagram of security information is depicted in accordance with an illustrative embodiment. In this illustrative example, transmission security information 900 may include pseudorandom sequence 902, encryption key 904, encryption algorithm 906, signal processor 908, and other suitable information.

In one example, transmission security information 900 may be a sequence of pseudorandom bits or a control key used to perform frequency hopping and dehopping functions, to perform time permutation and depermutation functions, to perform data cover and decover functions, or to perform other suitable transmission security functions by signal processor 908 in these illustrative examples. In other illustrative examples, transmission security information 900 may be instructions to randomize an order of transmission of signals 116 in FIG. 1 or some other suitable type of transmission security information, depending on the particular implementation. These functions assure availability and confidentiality of information 114 in the presence of jammers or other threats.

As depicted, encryption key 904 and encryption algorithm 906 may be used to encrypt information 114. The encryption of information may provide further security to protect availability and confidentiality of information 114.

The illustration of communications environment 100 and the different components in communications environment 100 in FIGS. 1-9 are not meant to imply physical or architectural limitations to the manner in which an illustrative embodiment may be implemented.

For example, control system 121 may be in another location such as in orbit or moving through space above Earth 108 in FIG. 1. As another illustrative example, satellite 200 may have other configurations in other illustrative examples other than the configuration shown in FIG. 2. For example, in some illustrative examples, satellite 200 may only include transponder system 217 and may not have transceiver system 218. In another example, sensor system 216 may be omitted from payload 208 in FIG. 2.

Figure 10:
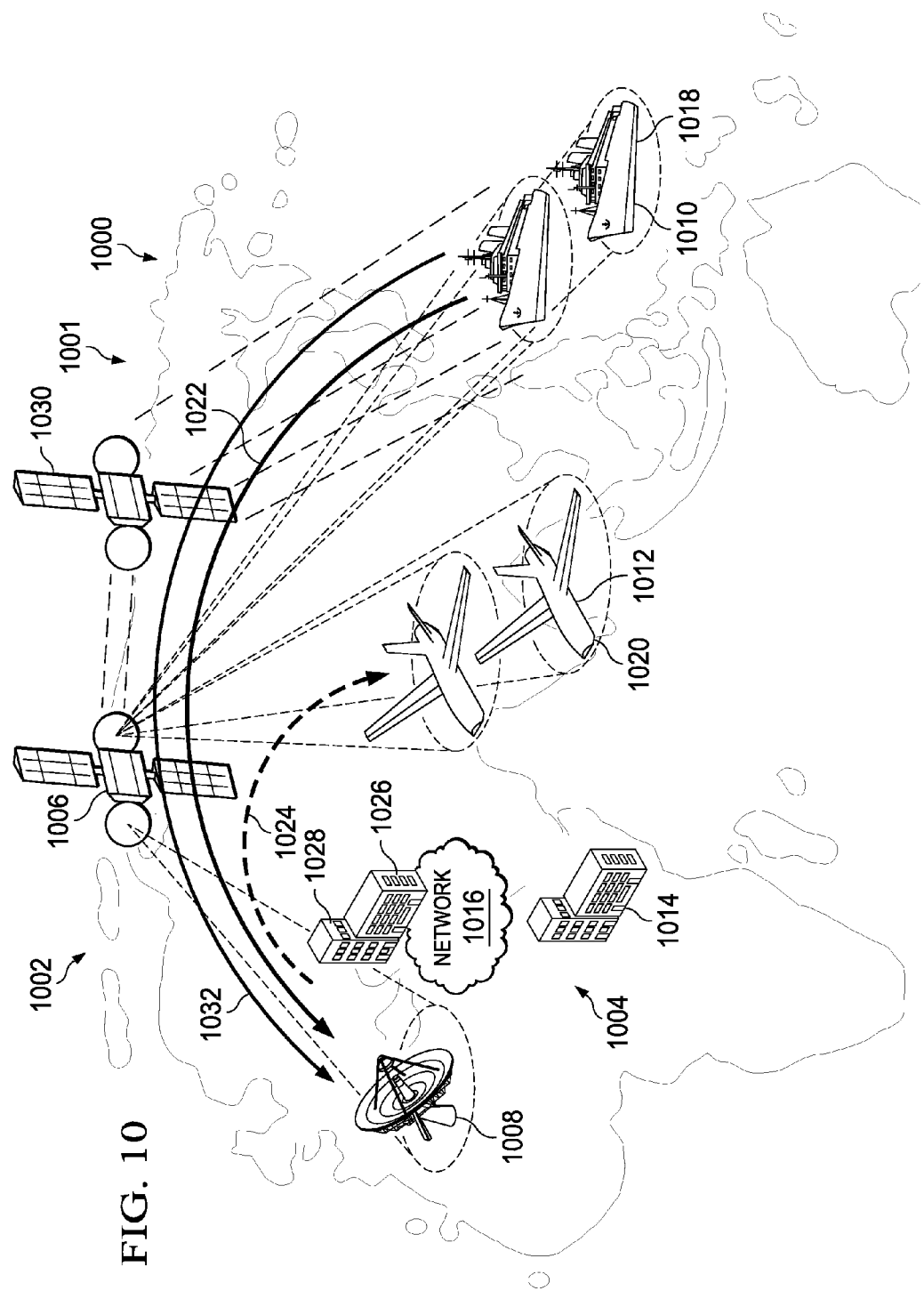
FIG. 10 is an illustration of a communication of information in a communications environment in accordance with an illustrative embodiment.

With reference now to FIG. 10, an illustration of a communication of information in a communications environment is depicted in accordance with an illustrative embodiment. Communications environment 1000 is an example of one implementation for communications environment 100 shown in block form in FIG. 1.

In this depicted example, communications environment 1000 includes communications network 1001. Communications network 1001 has orbital portion 1002 and terrestrial portion 1004. Orbital portion 1002 includes satellite 1006 and satellite 1030. Terrestrial portion 1004 includes gateway 1008, first terminal device 1010, second terminal device 1012, terrestrial user 1026, mission control 1014, and network 1016.

In this illustrative example, gateway 1008 and mission control 1014 are connected to network 1016. Network 1016 may be, for example, a wide area network, a local area network, the Internet, or some other suitable type of network.

Mission control 1014 is configured to provide management of various resources in communications environment 1000. For example, mission control 1014 may control satellite 1006, satellite 1030, and gateway 1008. In particular, mission control 1014 may manage resources in these components to provide communication connectivity among various terminal devices and between various terminal devices and terrestrial users in communications environment 1000. In this illustrative example, mission control 1014 is configured to provide mission planning, resource control, gateway synchronization, payload control, health management, and other suitable types of functions depending on the particular implementation.

In this illustrative example, first terminal device 1010 is located on surface ship 1018. Second terminal device 1012 is located on aircraft 1020.

In this illustrative example, first terminal device 1010 may send information to second terminal device 1012. When first terminal device 1010 sends information to second terminal device 1012, first terminal device 1010 generates a wideband frequency hopping signal. First terminal device 1010 sends the information in the wideband frequency hopping signal to satellite 1006 and satellite 1006 retransmits the wideband frequency hopping signal to gateway 1008 as shown by path 1022.

In turn, gateway 1008 is configured to dehop the wideband frequency hopping signal. In this case, gateway 1008 dehops the wideband frequency hopping signal to form a processed signal. Gateway 1008 transmits the processed signal as a wideband frequency hopped signal to a destination terminal device, second terminal device 1012 in aircraft 1020.

In this illustrative example, the transmission of the processed signal to second terminal device 1012 passes through satellite 1006 as indicated by path 1024. In other words, satellite 1006 receives the processed signal and retransmits the processed signal along path 1024. In this particular example, the processed signal is a second wideband frequency hopping signal that is transmitted along path 1024 to second terminal device 1012. Second terminal device 1012 is configured to dehop the second wideband frequency hopping signal to obtain the information in these illustrative examples.

As can be seen in this illustrative example, the processes for dehopping and hopping the signal, and for other signal processing functions such as demodulation, deinterleaving, decoding, switching, modulation, interleaving, and encoding, are not performed by satellite 1006. As a result, the amount of equipment needed on satellite 1006 may be less than otherwise needed if processing where to occur on satellite 1006. Further, the processing resources in satellite 1006 may be applied to other functions since dehopping and hopping and other signal processing functions are not performed by satellite 1006.

Moreover, in these illustrative examples, a pseudorandom number sequence may be generated by mission control 1014 and distributed to gateway 1008, first terminal device 1010, and second terminal device 1012 for hopping and dehopping signals in these illustrative examples. The gateway 1008 or mission control 1014 also may manage the synchronization of first terminal device 1010 and second terminal device 1012, by means of exchange of sync signals between gateway 1008 and first terminal device 1010 and second terminal device 1012.

In these illustrative examples, the synchronization may be achieved by means of exchange of sync signals between gateway 1008 and first terminal device 1010 and second terminal device 1012 through satellite 1006 and satellite 1030. In other illustrative examples where a satellite 1006 has connectivity to multiple gateways 1008, the gateways 1008 are synchronized to each other by means of a beacon broadcast by the satellite 1006 which contains a pseudorandom number code which can be used to determine relative path length between the satellite 1006 and the gateways 1008. In yet further illustrative examples, where satellite 1006 performs frequency hopping and dehopping, satellite 1006 is synchronized to gateway 1008 by means of a beacon broadcast by the satellite 1006 which contains both a pseudorandom number code and a timestamp which can be used to track the absolute path length between the satellite 1006 and the gateways 1008.

In this manner, the different components in communications network 1001 may perform frequency hopping using a pseudorandom number sequence at the appropriate times. In other words, the selection of a frequency using the pseudorandom number sequence may be made such that the correct frequency is selected for hopping and dehopping signals in these illustrative examples.

In another illustrative example, first terminal device 1010 may send information to terrestrial user 1026. Terrestrial user 1026 is located in building 1028 in these illustrative examples. Terrestrial user 1026 is connected to network 1016. When first terminal device 1010 sends information to terrestrial user 1026, information may be transmitted along path 1022 to gateway 1008.

In one illustrative example, gateway 1008 generates a processed signal, which does not take the form of a wideband frequency hopping signal. Instead, gateway 1008 may send the processed signal without performing hopping. Rather than performing hopping on the signal, the information may be transmitted in the processed signal through network 1016.

In these illustrative examples, network 1016 may be a secured network and may take various forms. For example, network 1016 may be a ground based wired network, a wireless network, a synchronous optical network (SONET), an optical network, or some other suitable type of network. The transmission of information may be made using internet protocol or other digital communications depending on the particular implementation.

In yet another illustrative example, first terminal device 1010 may send information in the wideband frequency hopping signal through path 1032 instead of path 1022. Path 1032 uses satellite 1006 and satellite 1030. In this illustrative example, satellite 1030 first receives the wideband frequency hopping signal and retransmits the wideband frequency hopping signal in a cross-link to satellite 1006. Satellite 1006 then sends the wideband frequency hopping signal to gateway 1008. From this point, the wideband frequency hopping signal may be processed in a manner described above.

Thus, communication network 1001 enables anti-jam protected communication throughout the coverage area of a first transponder on satellite 1006 and possibly one or more additional transponders on satellite 1030 or other satellites in communications environment 1000. The first transponder and any other transponders may be relatively simple, small and light weight devices. These types of devices may enable commercial satellites or other satellites to host the transponder, thereby reducing cost of the communication system.

Additionally, gateway devices, such as the gateway 1008, may be located in sanctuary areas that can be protected from harm and from jamming. A sanctuary area may be an area with a desired level of security such that jamming may be prevented. A sanctuary area may be a remote location, a ground station, a complex, a military base, or some other area with a desired level of security.

Further, since gateway devices of communication network 1001 can communicate via terrestrial networks, other components of communication network 1001, such as mission control system 1014, a payload control system, a resource control system, a mission planning system, a resource control and mission planning database, a key facility, transmission security and communications security facilities, other components, or a combination thereof, may be collocated with gateway 1008 or may be located remotely from the gateway 1008.

Moreover, communications can be received at gateway 1008 or routed from gateway 1008 over the terrestrial network eliminating or reducing the use of dedicated satellite communication user terminals at fixed installations such as command centers. Additionally, high security information and components can be more closely controlled and implemented with lower cost. For example, hardware and software to perform transmission security and communications security processing, such as frequency hopping and dehopping or orderwire message encryption and decryption, is not needed on satellites and can instead be located at protectable installations associated with gateway 1008 or mission control 1014.

Figure 11:
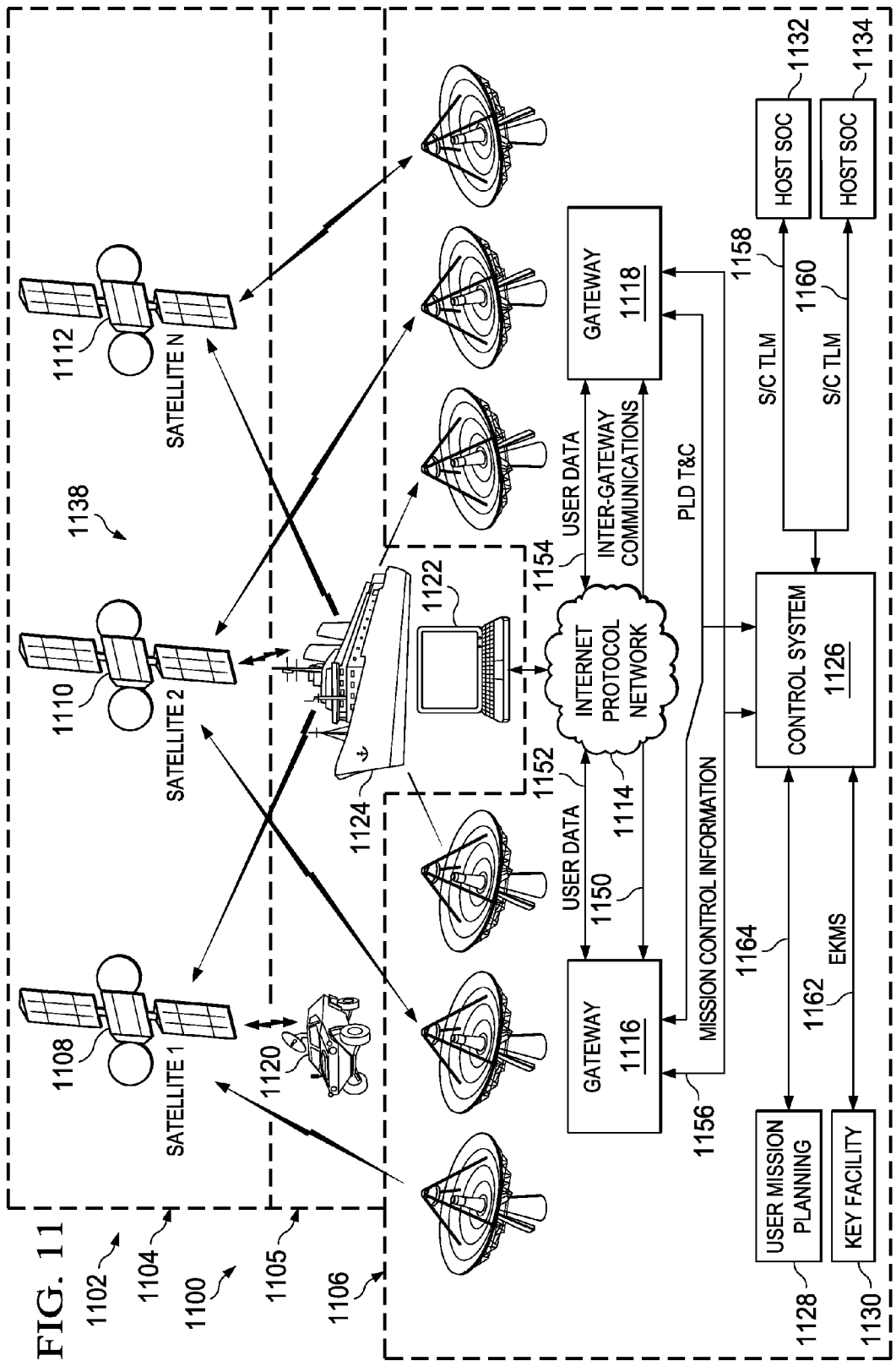
FIG. 11 is another illustration of a communications environment in accordance with an illustrative embodiment.

Turning now to FIG. 11, another illustration of a communications environment is depicted in accordance with an illustrative embodiment. Communications environment 1100 is an example of another implementation for communications environment 100 in FIG. 1.

In this illustrative example, message flow between components in communications environment 1000 is depicted. As depicted, communications environment 1100 is comprised of communications network 1102. Communications network 1102 has orbital portion 1104, user terminal portion 1105, and terrestrial portion 1106. Orbital portion 1104 of communications network 1102 includes satellite 1108, satellite 1110, and satellite 1112.

In this example, user terminal portion 1105 of communications network 1102 includes first terminal device 1120, terrestrial user 1122, and second terminal device 1124. Terrestrial portion 1106 includes internet protocol network 1114, gateway 1116, gateway 1118, control system 1126, user mission planning 1128, key facility 1130, host satellite operation control 1132, and host satellite operation control 1134.

In these illustrative examples, gateway 1116, gateway 1118, and terrestrial user 1122 are connected to internet protocol network 1114. In this example, internet protocol network 1114 may provide for the exchange of information such as user data, inter-gateway communications, payload telemetry and command, resource control management commands, synchronization control information, transmission security information, and other suitable types of information.

As depicted, intergateway communications 1150 may be sent between gateway 1116 and gateway 1118. User data 1152 may be sent from gateway 1116 to terrestrial user 1122 through internet protocol network 1114. User data 1154 may be sent from gateway 1118 to terrestrial user 1122 through internet protocol network 1114. User data 1152 and user data 1154 also may be sent from first terrestrial user 1122 to gateway 1116 and gateway 1118, respectively.

Further, in these illustrative examples, mission control information 1156 may be sent between control system 1126 and at least one of gateway 1116 and gateway 1118. This mission control information may then be sent to at least one of satellite 1108, satellite 1110, and satellite 1112 from at least one of gateway 1116 and gateway 1118. This mission control information may then be further distributed to first terminal device 1120 and second terminal device 1124. The information may be distributed to terrestrial user 1122 over internet protocol network 1114 through gateway 1116 and gateway 1118.

In these illustrative examples, mission control information 1156 may include a number of different types of information. For example, mission control information 1156 may include at least one of payload telemetry and command, resource control management commands, synchronization control information, transmission security information, and other information.

In some illustrative examples, mission control information 1156 may be sent between control system 1126 and gateway 1116 using internet protocol network 1114. Similarly, mission control information 1156 may be sent between control system 1126 and gateway 1118 using internet protocol network 1114. When mission control information 1156 is sent from control system 1126 to gateway 1116, gateway 1118, or both, mission control information 1156 may be configuration and status data.

Intergateway communications 1150 between gateway 1116 and gateway 1118 may be sent via a transport service that provides constant delay with low levels of delay variation. Such a service may be a synchronous optical network in these illustrative examples. An internet protocol network, multiprotocol label switching, and other suitable types of services may also be used to send intergateway communications 1150 between gateway 1116 and gateway 1118, depending on the functionality involved.

In this illustrative example, host satellite operation center 1132 may send satellite operation center information 1158 to control system 1126. Additionally, host satellite operation center 1134 also may send satellite operation center information 1160 to control system 1126. As another illustrative example, key facility 1130 may send transmission security information 1162 to control system 1126. In another example, user mission planning 1128 may send planning information 1164 to control system 1126. As can be seen, control system 1126 may use all of this information to generate mission control information 1156 for distribution to gateway 1116 and gateway 1118 as well as other components through these gateways.

Although the flow of information is described in only one direction in some of these examples in communications environment 1100, information may flow in the other direction or in both directions depending on the particular implementation. For example, control system 1126 may return data or other information to host satellite operation center 1132 and host satellite operation center 1134. As another example, control system 1126 may send requests to key facility 1130 with respect to the generation of transmission security information 1162.

In this illustrative example, gateway 1116 and gateway 1118 in terrestrial portion 1106, and first terminal device 1120 and second terminal device 1124 in user terminal portion 1105 may exchange signals 1138 with satellite 1108, satellite 1110, and satellite 1112 in orbital portion 1104 of communications network 1102. The exchange of signals 1138 with satellite 1108, satellite 1110, and satellite 1112 may provide a medium to exchange information between gateway 1116, gateway 1118, first terminal device 1120, and second terminal device 1124.

In these illustrative examples, signals 1138 may be wideband frequency hopping signals used to avoid interference during the transmission of information between orbital portion 1104 and the terrestrial portion 1106 and user terminal portion 1105 of communications network 1102.

In these illustrative examples, gateway 1116 and gateway 1118 provide an interface between control system 1126 and other components in communications environment 1100. As depicted, gateway 1116 and gateway 1118 provide circuit termination with connectivity to a terrestrial network such as internet protocol network 1114.

In this example, gateway 1116 and gateway 1118 are the components in which hopping and dehopping of signals 1138 are performed. In this manner, at least one of less weight, lower resource use, and less expense may occur with respect to satellite 1108, satellite 1110, and satellite 1112. As a result, signals 1138 are not dehopped or hopped by satellite 1108, satellite 1110, or satellite 1112 in these illustrative examples. Instead, these satellites may retransmit signals without performing signal processing with respect to hopping or dehopping the wideband frequency signals that are being transmitted in signals 1138.

Further, at least one of gateway 1116 and gateway 1118 may each send information from control system 1126 to perform synchronization with satellite 1108, satellite 1110, and satellite 1112 to avoid interference with signals 1138. This interference may be self-interference between users of the system.

In these illustrative examples, gateway 1116 and gateway 1118 are synchronized such that signals 1138 are accurately aligned in time. As a result of synchronization, signals 1138 will not collide with each other.

In this example, at least one of satellite 1108, satellite 1110, and satellite 1112 send beacon information to gateway 1116 and gateway 1118. The beacon information contains a pseudorandom code with good correlation properties and of suitable length to resolve uncertainty in satellite range that may result from conventional ranging techniques.

Next, gateway 1116 and gateway 1118 record the time of receipt of the beacon information and transmit that time of receipt to control system 1126. Control system 1126 then determines the difference in range from the satellite transmitting the beacon information to each of the gateways, based on the delay of the signal reaching each gateway. Based on the delay measurements, the mission control center 1126 identifies timing corrections for each of the gateways. The timing corrections are used to ensure that that signals 1138 are properly aligned at the payload to eliminate mutual interference. Control system 1126 sends instructions to gateway 1116 and gateway 1118 to adjust respective time so that terminals synchronized to one gateway can avoid interference with terminals synchronized to other gateways when transmitting and receiving signals 1138.

In these illustrative examples, gateway 1116 and gateway 1118 also may provide synchronization processing. For example, gateway 1116, gateway 1118, or both may collect data from each gateway and determine timing correctly for each gateway such that signals 1138 are properly aligned. In this manner, mission control 1126 is not needed to synchronize gateway 1116 and gateway 1118.

In this illustrative example, control system 1126 provides a centralized location for resource control, mission planning, key management, payload control, gateway synchronization, transmission security, and other suitable functions. In other words, control system 1126 provides a centralized location for information and control.

As depicted, host satellite operation center 1132 and host satellite operation center 1134 may send commands and requests to control system 1126. In turn, control system 1126 sends control signals to satellite 1108, satellite 1110, and satellite 1112 to control the platform side of these satellites. User mission planning 1128 may generate commands to perform different operations with payloads in satellite 1108, satellite 1110, and satellite 1112. Control system 1126 receives the commands and sends the commands to these satellites through gateway 1116 and gateway 1118.

Key facility 1130 may store keys for secure transmissions. These keys may include, for example, at least one of a pseudorandom code, an encryption key, and other suitable types of information. Key facility 1130 may send this information for storage and distribution by control system 1126 in these illustrative examples.

Although the illustrative embodiments in FIG. 11 are depicted with three satellites in orbital portion 1104 of communications network 1102, any number of satellites may be used. For example, one satellite, five satellites, ten satellites, nineteen satellites, or some other suitable number of satellites may be present in orbital portion 1104 of communications network 1102, depending on the particular implementation.

Figure 12:
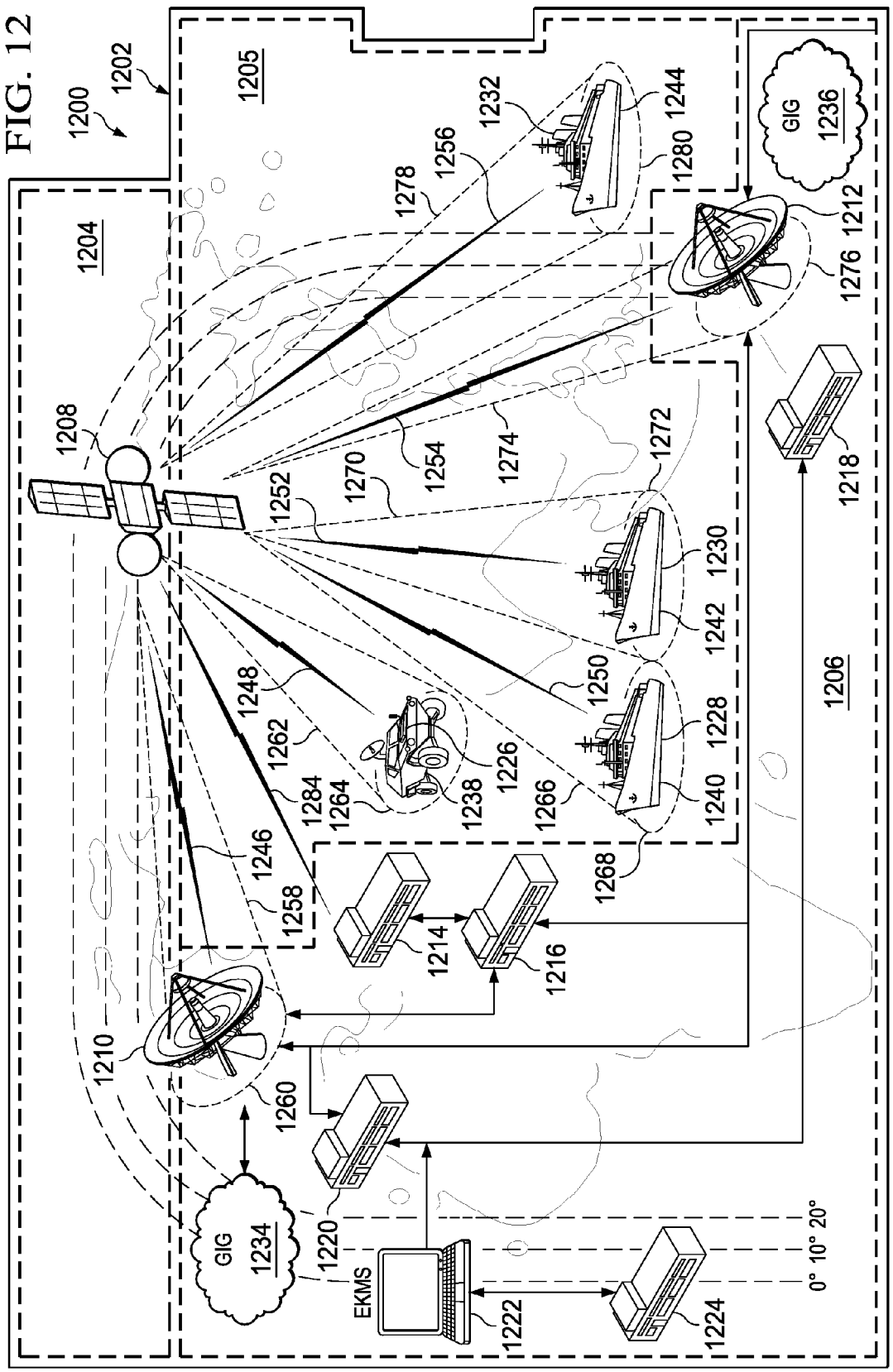
FIG. 12 is an illustration of a communications environment in accordance with an illustrative embodiment.

Turning now to FIG. 12, an illustration of a communications environment is depicted in accordance with an illustrative embodiment. In this depicted example, communications environment 1200 is an example of one implementation for communications environment 100 shown in block form in FIG. 1.

In this illustrative example, communications network 1202 in communications environment 1200 is configured to provide communication of information between different components. As depicted, communications network 1202 includes orbital portion 1204, user terminal portion 105, and terrestrial portion 1206. In this example, satellite 1208 is located in orbital portion 1204 of communications network 1202.

In this illustrative example, user terminal portion 105 is comprised of first terminal device 1226, second terminal device 1228, third terminal device 1230, and fourth terminal device 1232. Terrestrial portion 1206 of communications network 1202 is comprised of gateway 1210, gateway 1212, host telemetry and command 1214, payload telemetry and command 1216, deployed planning 1218, master planning 1220, key management system 1222, key facility 1224, network 1234, and network 1236.

As depicted, host satellite operations center 1214 is a ground facility for monitoring the status of and for the control of host satellite mission equipment. Host satellite operations center 1214 may be part of communications network 1202 or operated by a host of the payload. For example, when using a host satellite for communications, host satellite operations center 1214 may be operated by the owner of the host satellite.

In this illustrative example, payload control system 1216 is configured to control the operations of the payload. For example, payload control system 1216 may be configured to send control signals to satellite 1208 via gateway 1210 or gateway 1212 to control such functions on the payload 208, such as the pointing of the antennas 222.

In this example, deployed planning 1218 enables end users of the system to plan usage of the system and provides tools for end users to appropriately submit requests to mission planning system 1220 for communications services. In some embodiments, such deployed planning 1218 and associated tools may not be required, and all planning activities may be conducted directly by mission planning system 1220.

As depicted, mission planning system 1220 allocates system resources in satellite 1208, gateway 1210, gateway 1212, network 1234, and network 1236, and other system resources in support of user communication requests. System resources include control of antenna resources, allocation of frequency and time slot assignment for communications, for orderwire transmissions, and for synchronization transmissions, and for other system resources. Mission planning system furthermore directs configuration of satellite 1208, gateway 1210, gateway 1212, network 1234, network 1236, first terminal device 1226, second terminal device 1228, third terminal device 1230, and fourth terminal device 1232, and other elements of the communication network 1202 in communication environment 1200, in support of allocations to support user communication requests.

In these illustrative examples, key management system 1222 is configured to generate information to provide security in the transmission of signals. In particular, key management system 1222 is configured to generate transmission security information used by gateway 1210 and gateway 1212. For example, key management system 1222 may be configured to generate information for frequency hopping. Additionally, key management system 1222 also may generate encryption keys for encrypting information, access control keys for at least one of first terminal device 1226, second terminal device 1228, third terminal device 1230, fourth terminal device 1232, and other suitable types of information.

Key management system 1222 interfaces with key facility 1224 to obtain key material. Key facility 1224 may provide the key for key management system 1222 to manage security of communications network 1202. Key facility 1224 may generate new keys periodically in these illustrative examples.

As depicted, first terminal device 1226 is associated with ground vehicle 1238. Second terminal device 1228 is associated with surface ship 1240. Third terminal device 1230 is associated with surface ship 1242 and fourth terminal device 1232 is associated with surface ship 1244.

In these examples, return uplinks to satellite 1208 from first terminal device 1226, second terminal device 1228, third terminal device 1230, and fourth terminal device 1232 may use extremely high frequency signals, such as 43.5-45.5 GHz. Forward downlinks from satellite 1208 to first terminal device 1226, second terminal device 1228, third terminal device 1230, and fourth terminal device 1232 may use super high frequency signals, such as 20.2-21.2 GHz. Forward uplink to satellite 1208 from gateway 1210 and gateway 1212 may use extremely high frequency signals, such as 30-31 GHz. Return downlink from satellite 1208 to gateway 1210 and gateway 1212 may use super high frequency signals, such as 18-20 GHz or 20.2-21.2 GHz.

Host satellite operations center 1214 may communicate with satellite 1208 using $K_a$ signals 1284. $K_a$ signals 1284 are signals in a $K_a$ band. $K_a$ signals 1284 may have a frequency from about 26.5 GHz to about 40 GHz in these illustrative examples. $K_a$ signals 1284 may be in the microwave band of the electromagnetic spectrum.

As depicted, satellite 1208 may exchange radio frequency signal path 1246, radio frequency signal path 1248, radio frequency signal path 1250, radio frequency signal path 1252, radio frequency signal path 1254, and radio frequency signal path 1256 with gateway 1210, first terminal device 1226, second terminal device 1228, third terminal device 1230, and fourth terminal device 1232, respectively.

In these illustrative examples, when satellite 1208 exchanges radio frequency signals, these signals may form beam 1258 with spot 1260, beam 1262 with spot 1264, beam 1266 with spot 1268, beam 1270 with spot 1272, beam 1274 with spot 1276, and beam 1278 with spot 1280.

Of course, communications with satellite 1208 may be performed using other types of signals, such as radio frequency signals in other frequency bands, or other suitable signals, in some illustrative examples.

Figure 13A:
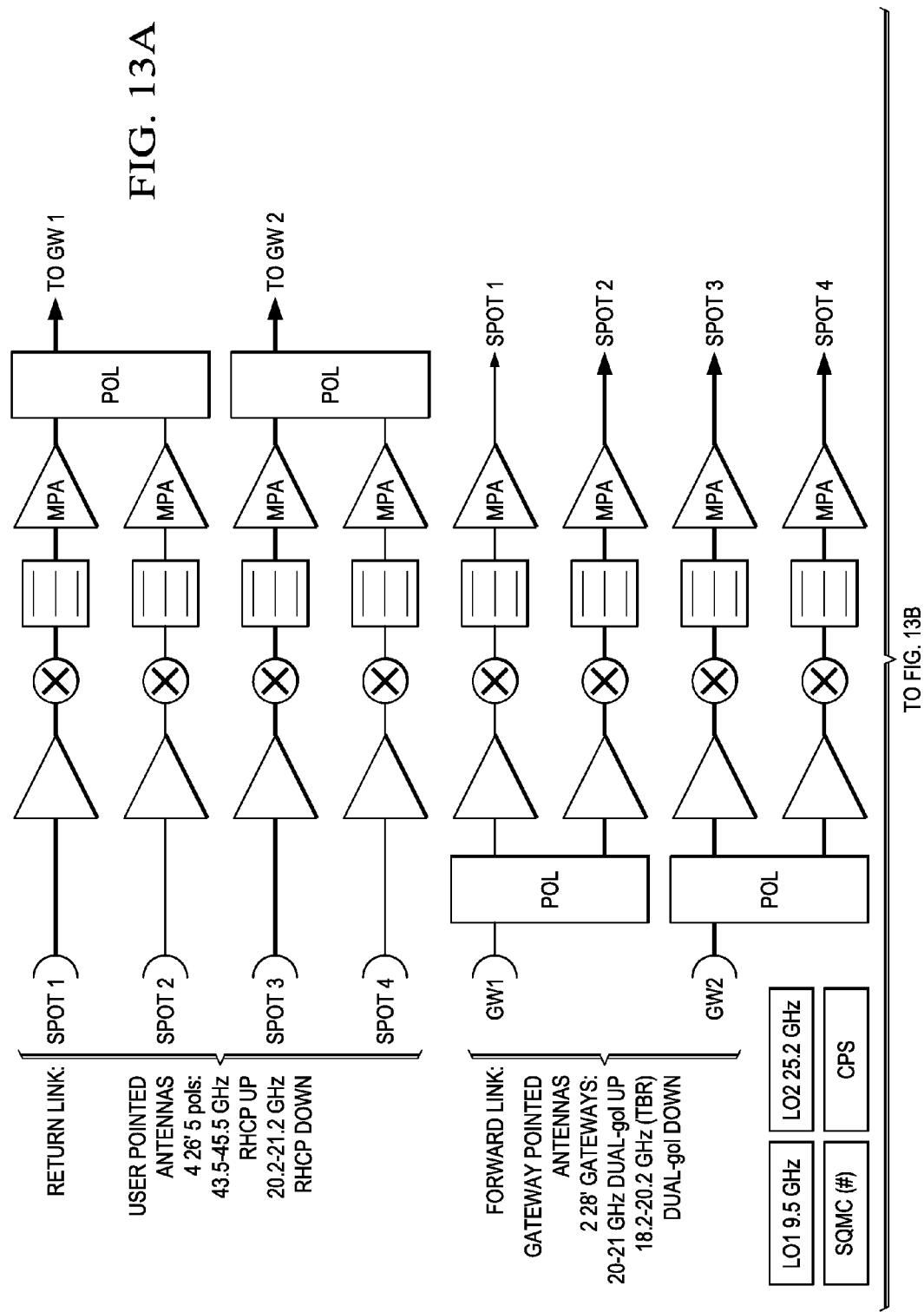
FIGS. 13A-13B are an illustration of a payload in accordance with an illustrative embodiment.
Figure 13B:
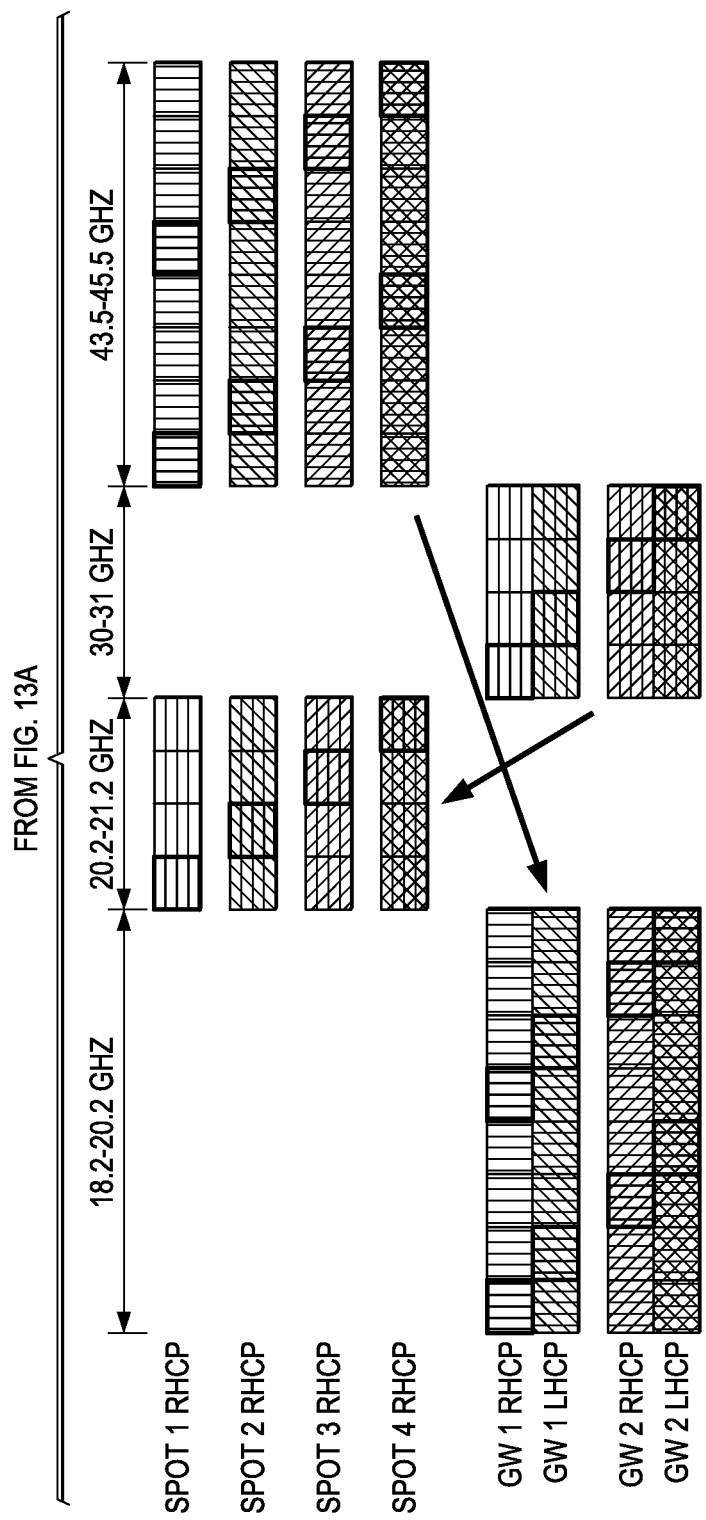

Turning now to FIGS. 13A-13B, illustrations of a payload is depicted in accordance with an illustrative embodiment. In this illustrative embodiment there are four dual-frequency single-polarization independently steerable user pointed antennas forming four user spot beams which provide connectivity to user terminals at 43.5-45.5 GHz for the return uplink and 20.2-21.2 GHz for the forward downlink. Additionally there are two dual-frequency dual-polarization independently steerable gateway pointed antennas forming two gateway spot beams which provide connectivity to the gateways at 30-31 GHz for the forward uplink and 18.2-20.2 GHz for the return downlink.

As depicted in the illustrative block diagram at the top of FIG. 13A and the illustrative frequency plan at bottom of FIG. 13B, return link signals from user terminals are received at 43.5-45.5 GHz on the single polarization user spot beams, using right-hand circular polarization. These signals are low-noise amplified and then block down-converted to the 18.2-20.2 GHz return downlink band. Return link signals from two user spot beams are multiplexed together on each dual-polarization gateway spot beam, using both right-hand circular polarization and left-hand circular polarization. In this way four single-polarization 2 GHz wideband hopping return user uplink beams can be multiplexed onto two dual-polarization 2 GHz wideband hopping return gateway downlink beams.

Furthermore, as depicted in the illustrative block diagram at the top of FIG. 13A and the illustrative frequency plan at bottom of FIG. 13B, forward link signals from gateways are received at 30-31 GHz on the dual-polarization gateway spot beams, using both right-hand circular polarization and left-hand circular polarization. These signals are low-noise amplified and then block down-converted to the single-polarization 20.2-21.2 GHz forward downlink band, and transmitted using right-hand circular polarization. Forward link signals destined for two user spot beams are multiplexed together on each dual-polarization gateway spot beam, using both right-hand circular polarization and left-hand circular polarization. In this way four single-polarization 1 GHz wideband hopping user forward downlink beams can be multiplexed onto two dual-polarization 1 GHz wideband hopping forward gateway uplink beams.

In this illustrative embodiment, the payload performs not hooping or dehopping of the wideband frequency hopping signals. The payload a simple wideband transponder for both the return link and the forward link.

Of course, in other illustrative embodiments, alternate numbers of user spot beams and gateway spot beams can be chosen, and alternate frequency bands and polarizations can be chosen. In other illustrative embodiments where satellite orbital slot and gateway sites are fixed, the gateway beams can be formed with a single fixed antenna with one or multiple feeds, rather than with independently steerable antennas, depending on the application.

Figure 14:
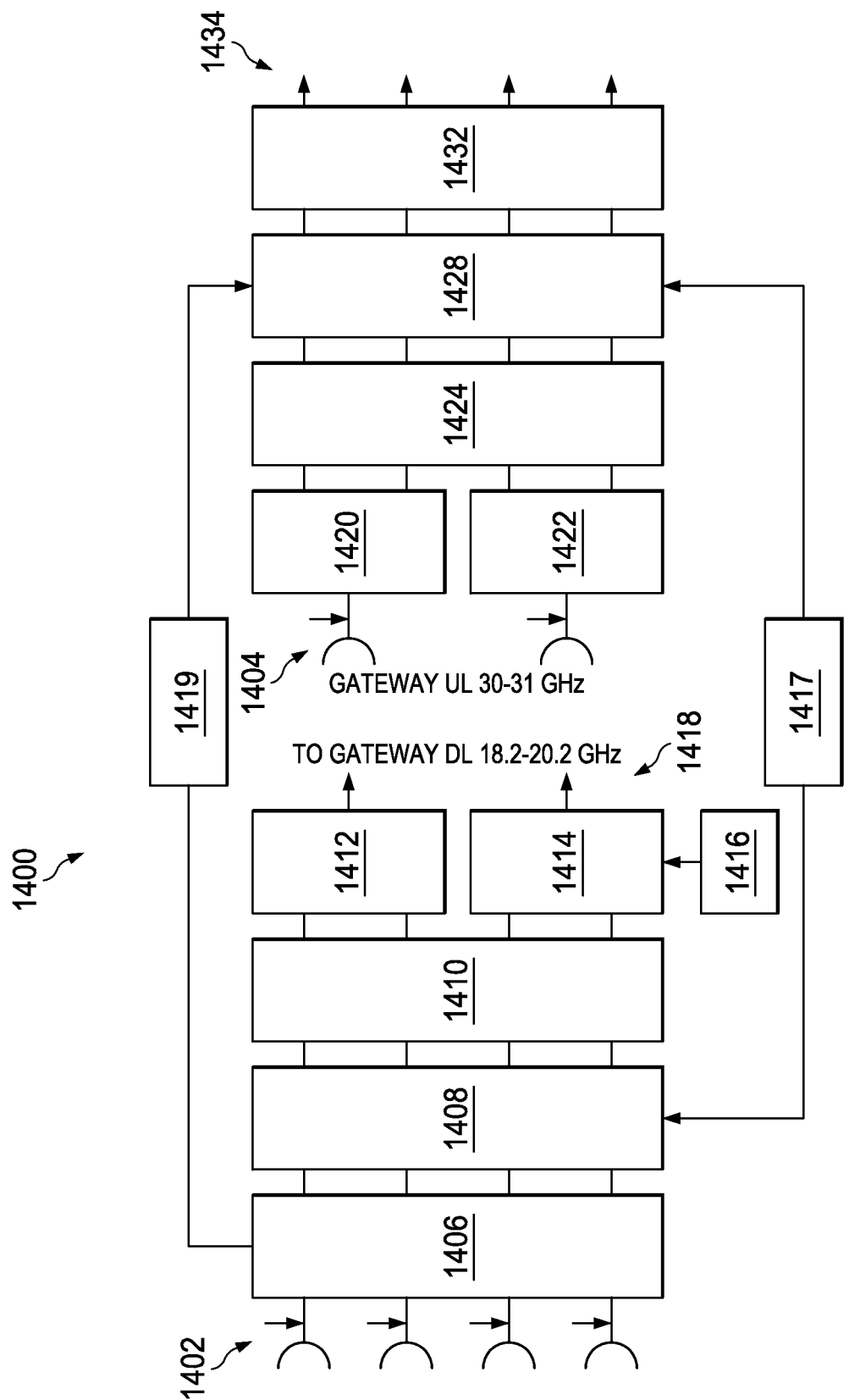
FIG. 14 is an illustration of a payload in accordance with an illustrative embodiment.

Turning now to FIG. 14, another illustration of a payload is depicted in accordance with an illustrative embodiment. In this illustrative example, payload 1400 is an example of one implementation for payload 208 in FIG. 2. As depicted, payload 1400 is shown providing connectivity between terminal devices 119 and two gateways in gateways 120 in FIG. 1.

In these depicted examples, payload 1400 includes four dual-frequency single-polarization user pointed antennas 1402. Each user pointed antenna in user pointed antennas 1402 receives return frequency hopped signals from terminal devices 119 within a coverage area of the antenna. This coverage area is a frequency directive coverage area in these illustrative examples. User pointed antennas 1402 also transmits frequency hopped signals originating at the gateway back to terminal devices 119 within the coverage area of the antenna.

In this illustrative example, gateway-pointed antennas 1404 are also present. Gateway-pointed antennas 1404 form two dual-frequency, dual-polarization, and directive gateway pointed coverage areas.

As depicted, the coverage areas of user pointed antennas 1402, the coverage areas of gateway-pointed antennas 1404, or both may be achieved in a number of different ways. For example, the coverage areas may be achieved using a number of different types, quantities, and combinations of antenna feeds and reflectors. As an example, user pointed antennas 1402 and gateway pointed antennas 1404 may be at least one of a gimbal antenna, a gimbal dish, a multi-beam antenna, a phased array, an array fed reflector, or other suitable types of devices. These antenna feeds and reflectors may be fixed, electronically steered, mechanically steered, or moved in another suitable fashion. Additionally, multiple coverage areas may share the same antenna or antenna reflector in these illustrative examples.

In these depicted examples, the return frequency hopped signals are received by user pointed antennas 1402 and amplified by low-noise amplifiers 1406. Low-noise amplifiers 1406 may be used to amplify the signal received from user pointed antennas 1402 to reduce losses in strength of the signal.

Next, the frequency hopped signals are down-converted by fixed local oscillator and filtered in fixed down-converters 1408. In this step, down-converting is performed by fixed local oscillator without frequency dehopping the signals. Fixed local oscillator down-converts the signals to the transmit band which is equal in bandwidth to the receive band.

In these illustrative examples, the frequency hopped signals are then amplified by linearized high-power amplifier 1410 and transmitted to gateways 120 through gateway-pointed antennas 1418. In this depicted example, two gateway pointed antennas are present in gateway pointed antennas 1418. Of course, other numbers of antennas may be used. For example, one antenna, three antennas, six antennas, or some other suitable number of gateway pointed antennas may be used, depending on the particular implementation.

Before being transmitted through downlink ports 1418 of gateway-pointed antennas 1404, the frequency hopped signals are multiplexed using multiplexer 1412 and multiplexer 1414. Multiplexer 1412 and multiplexer 1414 multiplex the frequency hopped signals using polarization diversity. A beacon signal from beacon generator 1416 is also multiplexed with the frequency hopped signals. This beacon signal is used to aid in system syntonization and synchronization in these illustrative examples.

As depicted, the forward frequency hopped signals are received by gateway-pointed antennas 1404. The signals are demultiplexed using demultiplexer 1420 and demultiplexer 1422. Demultiplexer 1420 and demultiplexer 1422 demultiplex the frequency hopped signals using polarization diversity. Next the signals and amplified by low noise amplifiers 1424.

Next, the signals are down-converted by fixed local oscillator and filtered by fixed down-converter 1428, without frequency dehopping, to the transmit band which is equal in bandwidth to the receive band. The frequency hopped signals are then amplified by high-power amplifier 1432 and transmitted to terminal devices 119 through downlink frequency ports 1434 on user pointed antennas 1402.

In this illustrative example, frequency hopped signals destined for two different user pointed antennas 1434 are multiplexed onto the same gateway pointed antenna feed using polarization diversity. All frequencies are locked to tunable master oscillator 1417, which is controlled by mission control system 402 in FIG. 4. Master oscillator 1417 controls local oscillator in fixed down-converter 1408 and fixed local oscillator in fixed down-converter 1428.

In some illustrative examples, payload 1400 may also include additional beacons to aid in terminal spatial acquisition of the satellite. Further, payload 1400 may also provide the flexibility to receive signals in one or more bands. For example, signals may be received both the EHF band, about 43.5-45.5 GHz, and the $K_a$ band, about 30-31 GHz.

Further, payload 1400 may also be configured to provide bypass 1419 for the $K_a$ band. Bypass 1419 is a function which bypasses the return gateway downlink and the forward gateway uplink, thereby connecting the return uplink directly to the forward downlink. In some illustrative examples, payload 1400 may also include an in-band telemetry and command link.

Figure 15:
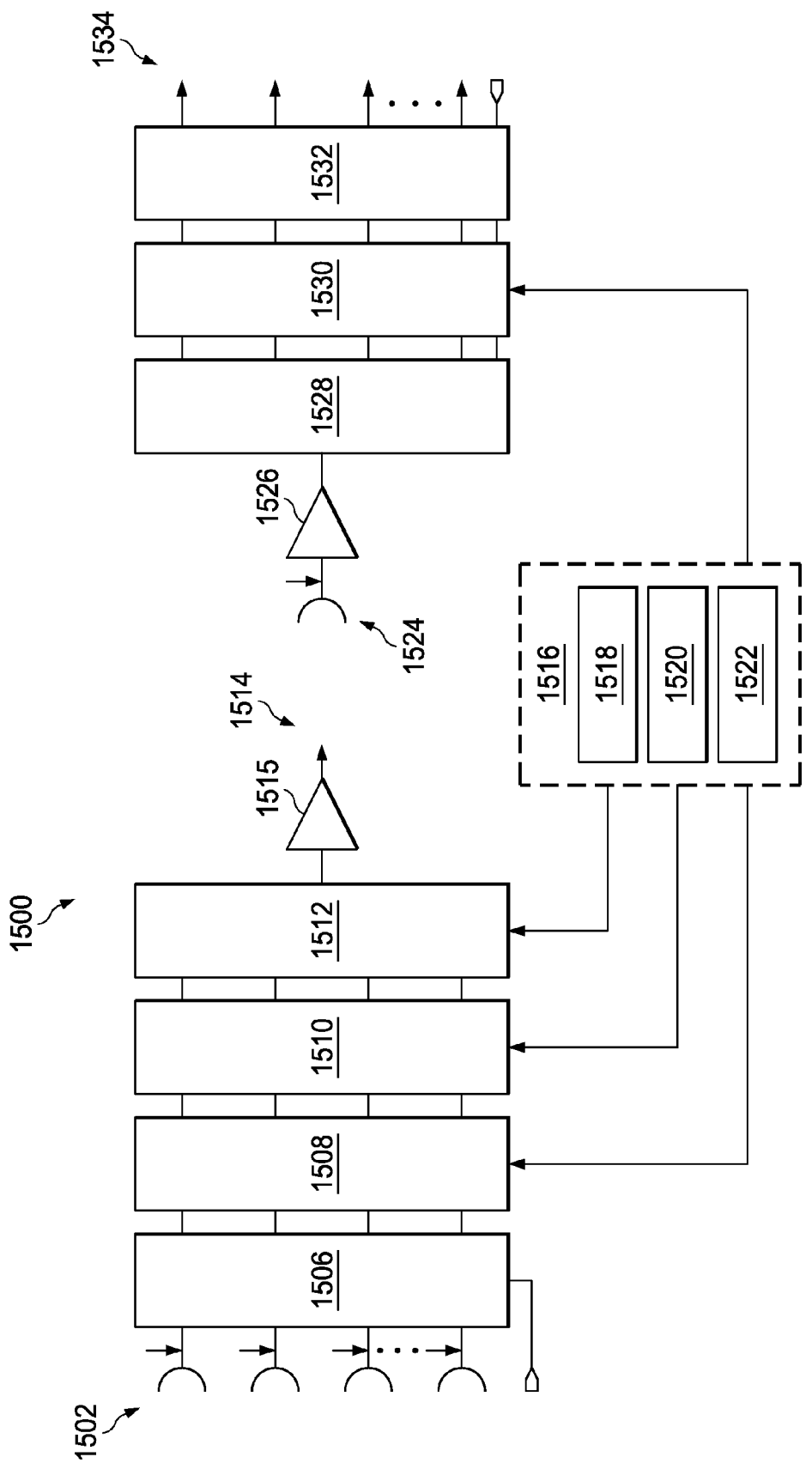
FIG. 15 is another illustration of a payload in accordance with an illustrative embodiment.

Turning now to FIG. 15, yet another illustration of a payload is depicted in accordance with an illustrative embodiment. In this illustrative example, payload 1500 is an example of one implementation for payload 208 in FIG. 2. As depicted, payload 1500 is shown providing connectivity between terminal devices 119 and two gateways in gateways 120 in FIG. 1.

In these depicted examples, payload 1500 includes four dual-frequency single-polarization user pointed antennas 1502. Each user pointed antenna in user pointed antennas 1502 receives return frequency hopped signals from terminal devices 119 within a coverage area of the antenna. User pointed antennas 1502 also transmits frequency hopped signals originating at the gateway back to terminal devices 119 within the coverage area of the antenna.

In this illustrative example, a single gateway-pointed antenna 1524 is also present. Gateway-pointed antenna 1524 forms one dual-frequency, dual-polarization, and directive gateway pointed coverage area.

In this example, the return frequency hopped signals are received by user pointed antennas 1502 and amplified by low noise amplifiers 1506. Next, the frequency hopped signals are dehopped and down-converted using a dehopping local oscillator in the dehopping down-converters 1508. The dehopped narrowband signals are then multiplexed together using an analog or digital channelizer 1510. A fixed upconverter 1512 translates the frequency of the signals, as required, into the desired transmit band. As a result of the dehopping and multiplexing functions, the transmit band is reduced in bandwidth relative to the receive band. In this illustrative example, the dehopping and multiplexing can be achieved by analog means, digital means, or both. If the dehopping and multiplexing are implemented digitally, transmit power levels of individual channels can be controlled on a frequency hop by frequency hop basis. This entirely eliminates unpredictable power robbing in the satellite transmitter which may occur with an analog channelizer with finite response time, or bandwidth which is not perfectly matched to individual dehopped carriers.

As depicted, the frequency hopped signals are then amplified by linearized high-power amplifier 1515 and then transmitted to the gateway through the downlink port 1514 gateway-pointed antenna 1524.

In this illustrative example, return frequency hopped signal sets from all antennas in user pointed antennas 1502 are multiplexed onto the same polarization of a common gateway pointed antenna feed. Multiplexed together with the signals to gateways 120 is a beacon signal from beacon 1520. The beacon signal is used to aid in overall system syntonization and synchronization in these illustrative examples. The time and frequency reference subsystem 1516 provides includes the tunable master oscillator 1522 for the payload, the time-of-day and TRANSEC generator 1518, as well as the beacon generator 1520.

As depicted, the forward frequency hopped signals are received by gateway pointed antenna 1524 and amplified by low noise amplifiers 1526. Next, the signals are de-multiplexed by de-multiplexer 1528 and down-converted by hopping local oscillators in the hopping down-converters 1530. The signals are converted to the transmit band which is, by means of the frequency hopping, significantly wider in bandwidth than the receive band.

The frequency hopped signals are then amplified by high-power amplifier 1532 and then transmitted to the terminal devices 119 through downlink ports 1534 of user pointed antennas 1502. In this illustrative example, frequency hopped signal sets destined for all four of user pointed antennas 1502 are multiplexed onto the same gateway pointed antenna feed using a common polarization. All frequencies are locked to tunable master oscillator 1522, which is controlled by mission control system 402 in FIG. 4.

In some illustrative examples, payload 1500 may also include additional beacons to aid in terminal spatial acquisition of the satellite. Payload 1500 may also provide the flexibility to receive signals in one or more bands.

Further, payload 1500 may also be configured to support multiple receive bands, like payload 1400, and to provide bypass function like payload 1400. Bypass is a function which bypasses the return gateway downlink and the forward gateway uplink, thereby connecting the return uplink directly to the forward downlink.

Figure 16:
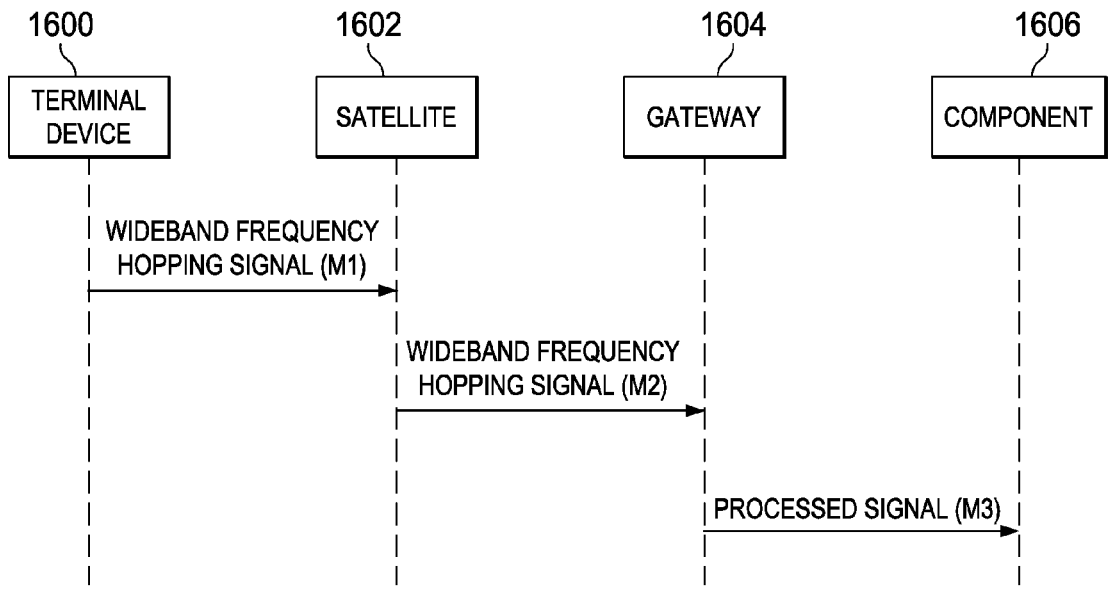
FIG. 16 is an illustration of a message flow diagram for transmitting information in signals in accordance with an illustrative embodiment.

Turning now to FIG. 16, an illustration of a message flow diagram for transmitting information in signals is depicted in accordance with an illustrative embodiment. In this depicted example, messages are exchanged between terminal device 1600, satellite 1602, gateway 1604, and component 1606. As depicted, terminal device 1600 may be in various locations. Terminal device 1600 may be associated with a platform such as an aircraft, a ground vehicle, a space station, a ship, a building, a person, or some other suitable type of platform.

Terminal device 1600 sends information in a wideband frequency hopping signal (message M1). Satellite 1602 receives the wideband frequency hopping signal and retransmits the wideband frequency hopping signal to gateway 1604 (message M2). The retransmission of the wideband frequency hopping signal is performed without any dehopping. In other words, the signal is not processed to identify the information in a channel having a number of frequencies in a range of frequencies for the signal.

The dehopping is performed by gateway 1604 when gateway 1604 receives the wideband frequency hopping signal from satellite 1602. The wideband frequency hopping signal is processed to form a processed signal. The processed signal is transmitted to component 1606 (message M3). The processed signal may be another wideband frequency hopping signal if component 1606 is another satellite. If component 1606 is a terrestrial component such as a computer, a terminal device, a mission control center, or some other device on a terrestrial portion of the communications network, the processed signal may be sent as an internet protocol signal. The processed signal may be sent using at least one of a wired network, a wireless network, an optical network, a synchronous optical network, or some other suitable type of network.

Figure 17:
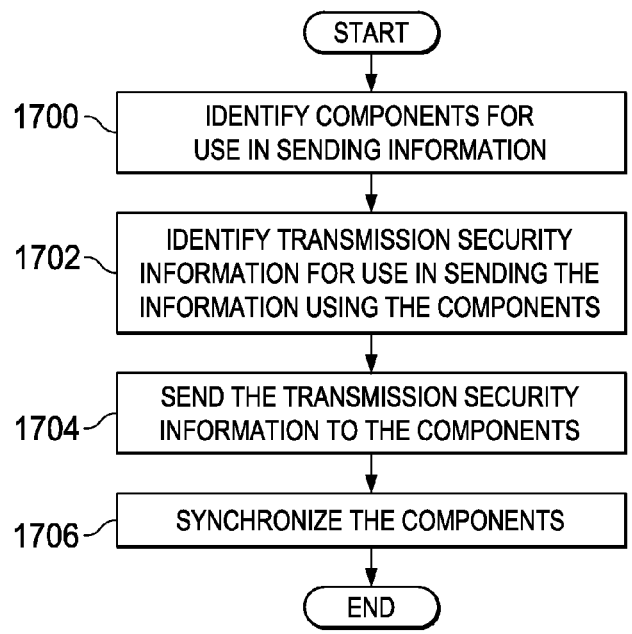
FIG. 17 is an illustration of a flowchart of a process for configuring a communications network to send information in accordance with an illustrative embodiment.

Turning now to FIG. 17, an illustration of a flowchart of a process for configuring a communications network to send information is depicted in accordance with an illustrative embodiment. The process illustrated in FIG. 17 may be implemented in communications network 102 in FIG. 1. In particular, one or more of the different operations may be implemented in a component such as ground system 118 in FIG. 1.

The process begins by identifying components for use in sending information (operation 1700). These components may be, for example, a gateway, a satellite, a terminal device, or some other suitable type of component. The process identifies transmission security information for use in sending the information using the components (operation 1702). The transmission security information identified may depend on the level of security desired for sending the information.

For example, if the information is sensitive or confidential, the transmission security information may include an identification of encryption algorithms, encryption keys, and other suitable information. If interference with the transmission of signals is undesired, then the transmission security information may also include a pseudorandom sequence that may be used for performing hopping and dehopping of the signals used to transfer the information.

The process then sends the transmission security information to the components (operation 1704). This information may be distributed in a number of different ways. For example, the transmission security information may be sent by one or more gateways to the different components. This information may be transmitted as beacon information in a beacon signal. This information may be transmitted over a terrestrial network, over a satellite network, by courier, or by any other suitable means.

Next, the process synchronizes the components (operation 1706), with the process terminating thereafter. This synchronization may be used to ensure that the different components involved in sending the information have substantially the same time. Time synchronization at the different components may be desired to ensure a particular level of security for information exchanged between the different components. For example, if hopping and dehopping of signals is performed, an incorrect frequency may be selected to hop or to dehop the carrier carrying the information if the time is not synchronized closely enough between the different components sending the information using frequency hopping signals. Furthermore if elements in the communications network are not well synchronized, carriers will interfere with each and cause degraded communications performance.

Figure 18:
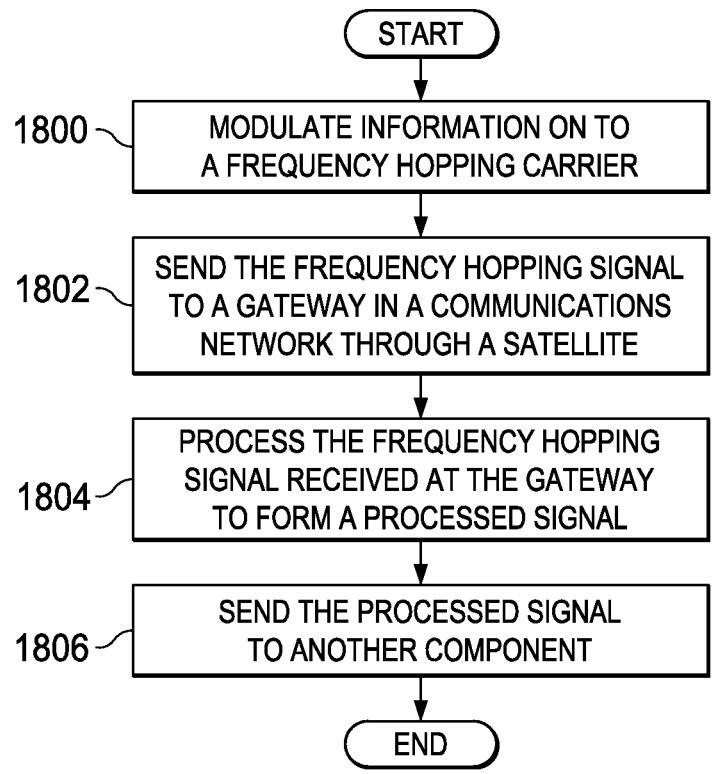
FIG. 18 is an illustration of a flowchart of a process for processing a signal in accordance with an illustrative embodiment.

Turning now to FIG. 18, an illustration of a flowchart of a process for processing a signal is depicted in accordance with an illustrative embodiment. The process illustrated in FIG. 18 may be implemented using communications network 102 in FIG. 1.

The process begins by modulating information on to a frequency hopping carrier (operation 1800) to form a frequency hopping signal. The process then sends the frequency hopping signal to a gateway in a communications network through a satellite (operation 1802). In operation 1802, the frequency hopping signal is unprocessed by the satellite to identify the information in the frequency hopping signal.

The frequency hopping signal received at the gateway is processed to form a processed signal (operation 1804). The processed signal is sent to another component (operation 1806) with the process terminating thereafter. The component may be, for example, at least one of a terminal device, the satellite, another satellite, another gateway, and a control system. The processed signal may be another frequency hopping signal or may be a more conventional signal in which the information is sent using the same frequency and without changing the frequency during transmission of the signal.

Figure 19:
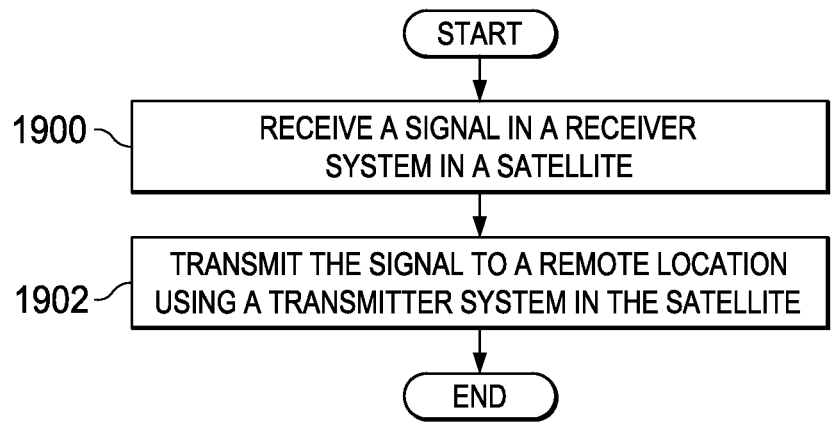
FIG. 19 is an illustration of a flowchart of a process for processing a signal in accordance with an illustrative embodiment.

Turning now to FIG. 19, an illustration of a flowchart of a process for processing a signal is depicted in accordance with an illustrative embodiment. The process illustrated in FIG. 19 may be implemented in satellite 200 in FIG. 2.

As depicted, the process begins by receiving a signal in a receiver system in a satellite (operation 1900). The signal has range of frequencies in which the information is carried in a channel having a different number of frequencies within the range of frequencies.

The process then transmits the signal to a remote location using a transmitter system in the satellite (operation 1902) with the process terminating thereafter. The signals are unprocessed by the satellite to identify the channel used to carry the information in the signal. In other words, dehopping, rehopping, or both dehopping and rehopping are not performed by the satellite. Instead, this process of identifying the information carried in a signal may be performed by another device such as a gateway on a terrestrial portion of a communications network.

Figure 20:
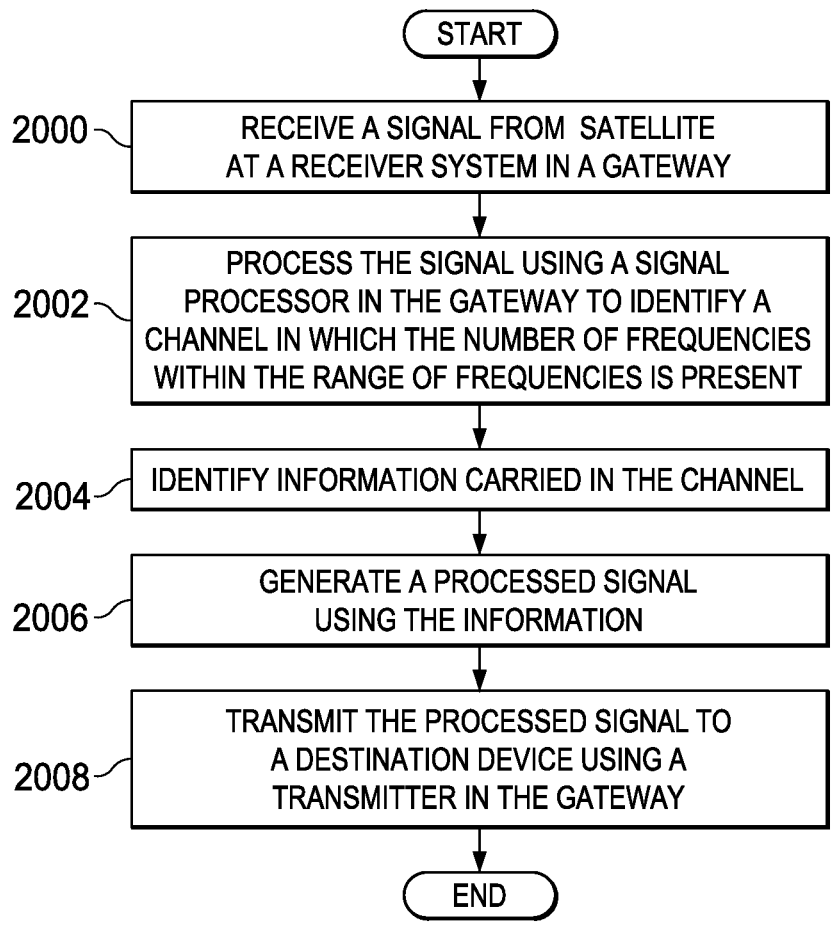
FIG. 20 is an illustration of a flowchart of a process for processing a signal in accordance with an illustrative embodiment.

Turning now to FIG. 20, an illustration of a flowchart of a process for processing a signal is depicted in accordance with an illustrative embodiment. The process illustrated in FIG. 20 may be implemented in gateways 120 in FIG. 1.

The process begins by receiving a signal from a satellite at a receiver system in a gateway (operation 2000). The signal has a range of frequencies in which the information is carried in a channel having a number of frequencies within the range of frequencies. The number of frequencies is configured to change over time in the signal. The signal is processed using a signal processor in the gateway to identify a channel in which the number of frequencies within the range of frequencies is present (operation 2002). The process identifies information carried in the channel (operation 2004).

The information is used to generate a processed signal (operation 2006). The process then transmits the processed signal to a destination device using a transmitter in the gateway (operation 2008) with the process terminating thereafter.

The destination device may take various forms. The destination device may be selected from one of a satellite, a gateway, a terminal device, a control signal, or some other suitable destination device. The processed signal may take various forms depending on the destination device. For example, if the processed signal is a satellite, the processed signal may be a wideband frequency hopping signal.

If the destination device is a device connected to the gateway through a network on the terrestrial portion of the communications network, the signal may employ a protocol such as an internet protocol or some other suitable protocol without frequency hopping. The processed signal also may be encrypted in some illustrative examples.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1706 in FIG. 17 that performs synchronization may be optional. In another illustrative example, the synchronization in operation 1706 may be performed at the same time or prior to the transmission of transmission security information in operation 1704.

Figure 21:
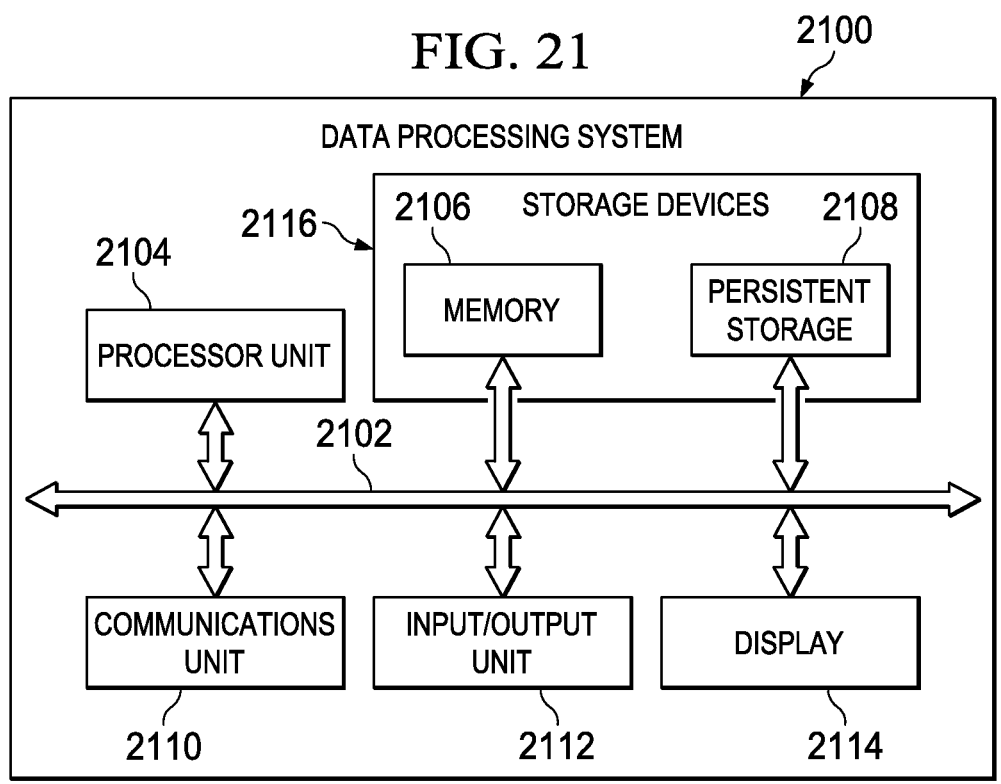
FIG. 21 is an illustration of a block diagram of a data processing system in accordance with an illustrative embodiment.
Figure 21:
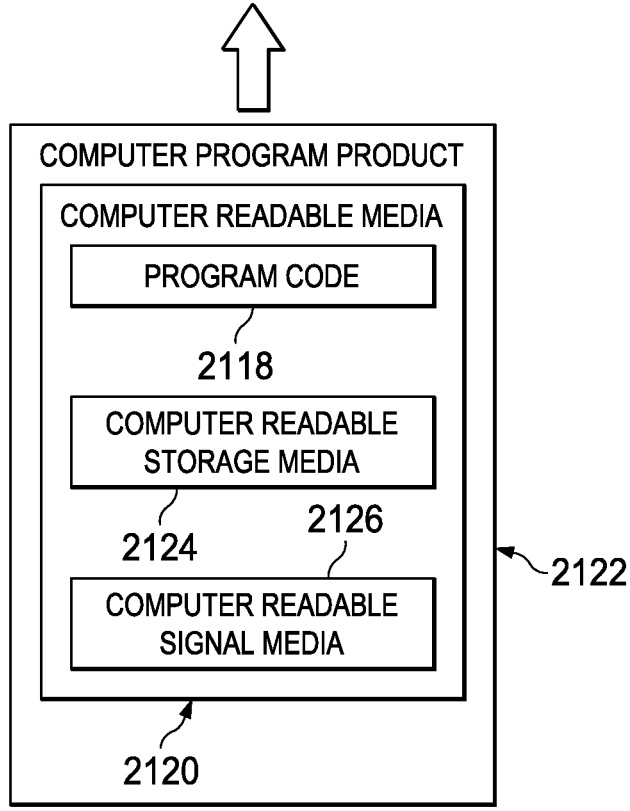

Turning now to FIG. 21, an illustration of a block diagram of a data processing system is depicted in accordance with an illustrative embodiment. Data processing system 2100 may be used to implement computers used in implementing various devices in communications environment 100 in FIG. 1, number of computers 246 in satellite 180 in FIG. 2, and other suitable devices in the different illustrative examples. In this illustrative example, data processing system 2100 includes communications framework 2102, which provides communications between processor unit 2104, memory 2106, persistent storage 2108, communications unit 2110, input/output unit 2112, and display 2114. In this example, communication framework may take the form of a bus system.

Processor unit 2104 serves to execute instructions for software that may be loaded into memory 2106. Processor unit 2104 may be a number of processors, a multi-processor core, or some other type of processor, depending on the particular implementation.

Memory 2106 and persistent storage 2108 are examples of storage devices 2116. A storage device is any piece of hardware that is capable of storing information, such as, for example, without limitation, data, program code in functional form, and/or other suitable information either on a temporary basis and/or a permanent basis. Storage devices 2116 may also be referred to as computer readable storage devices in these illustrative examples. Memory 2106, in these examples, may be, for example, a random access memory or any other suitable volatile or non-volatile storage device. Persistent storage 2108 may take various forms, depending on the particular implementation.

For example, persistent storage 2108 may contain one or more components or devices. For example, persistent storage 2108 may be a hard drive, a flash memory, a rewritable optical disk, a rewritable magnetic tape, or some combination of the above. The media used by persistent storage 2108 also may be removable. For example, a removable hard drive may be used for persistent storage 2108.

Communications unit 2110, in these illustrative examples, provides for communications with other data processing systems or devices. In these illustrative examples, communications unit 2110 is a network interface card.

Input/output unit 2112 allows for input and output of data with other devices that may be connected to data processing system 2100. For example, input/output unit 2112 may provide a connection for user input through a keyboard, a mouse, and/or some other suitable input device. Further, input/output unit 2112 may send output to a printer. Display 2114 provides a mechanism to display information to a user.

Instructions for the operating system, applications, and/or programs may be located in storage devices 2116, which are in communication with processor unit 2104 through communications framework 2102. The processes of the different embodiments may be performed by processor unit 2104 using computer-implemented instructions, which may be located in a memory, such as memory 2106.

These instructions are referred to as program code, computer usable program code, or computer readable program code that may be read and executed by a processor in processor unit 2104. The program code in the different embodiments may be embodied on different physical or computer readable storage media, such as memory 2106 or persistent storage 2108.

Program code 2118 is located in a functional form on computer readable media 2120 that is selectively removable and may be loaded onto or transferred to data processing system 2100 for execution by processor unit 2104. Program code 2118 and computer readable media 2120 form computer program product 2122 in these illustrative examples. In one example, computer readable media 2120 may be computer readable storage media 2124 or computer readable signal media 2126.

In these illustrative examples, computer readable storage media 2124 is a physical or tangible storage device used to store program code 2118 rather than a medium that propagates or transmits program code 2118.

Alternatively, program code 2118 may be transferred to data processing system 2100 using computer readable signal media 2126. Computer readable signal media 2126 may be, for example, a propagated data signal containing program code 2118. For example, computer readable signal media 2126 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 2100 are not meant to provide architectural limitations to the manner in which different embodiments may be implemented. The different illustrative embodiments may be implemented in a data processing system including components in addition to and/or in place of those illustrated for data processing system 2100. Other components shown in FIG. 21 can be varied from the illustrative examples shown. The different embodiments may be implemented using any hardware device or system capable of running program code 2118.

With the use of an illustrative embodiment, the cost, complexity, and size of satellites used for communications between orbital and non-orbital devices may be reduced. Further, since non-orbital gateway devices perform full signal processing, communications performance is better than with space-based partial-processed systems that demodulate only with hard decisions and do not soft-decision decode or de-interleave.

In addition, upgrades or modifications to the satellite communication system are relatively simple and inexpensive and do not entail orbital or space-based changes such as launching new satellites. Moreover, if the gateway device is remotely located, effects of uplink jamming in a particular user beam are not readily detectable by the jammer in that beam, thus denying the jammer feedback as to the effectiveness of its jamming techniques.

In a particular embodiment, no narrowband filtering is performed by the satellite-based communications system. In this embodiment, a return link downlink transmitter is adapted to be very robust to jammers. To provide a large gateway spectrum, many gateways and polarizations may be used. Additionally, adaptive power balance of dual polarization may be used on return downlinks so that jammers do not cause adverse affects on signals in non-jammed uplink beams.

Disclosed embodiments enable multiple extended data rate (XDR) circuits to use terrestrial connectivity to a relatively small number of Earth stations located on the Earth or moving with the atmosphere of the earth.

Additionally, these embodiments may be compatible with open standard for synchronization of orthogonal frequency-hopped signals using different air interface waveforms at all communication stack layers. Further, full processing XDR waveforms at the gateway devices enables improved performance relative to conventional communication systems in both additive white Gaussian noise (AWGN) and jamming environments, while maintaining backward compatibility with XDR waveform standards.

Consolidation of resource control for a multiplicity of payloads at a multiplicity of orbital slots and a multiplicity of gateways reduces coordination of distributed resource management databases (e.g., distinct resource control databases for each satellite or gateway) and simplifies resource control protocols and messaging for such activities as log-on/log-off; establishing, modifying, and releasing services; service reconfiguration; beam management; and resource monitoring. Consolidated resource control for all system transponders on all satellites and for all gateway devices and terrestrial resources eliminates mediation problems and crosslink protocols required in more traditional systems to maintain database synchronization.

Disclosed embodiments provide return link robustness to in-beam interference and reduce power-robbing on return link downlink transmitters. Additionally, return link downlink transmitters that are used are linear and robust enough to handle instantaneous power pulses with peak power significantly higher than average jammer power.

In a particular embodiment, multiple gateways use multiple polarizations to support a multiplicity of uplink user beams. Linear return downlinks are used to mitigate negative communications performance impact due to intermodulation products, signal suppression, and power robbing due to the received jammer signal, with average power many times larger than signals of interest and with instantaneous jammer power pulses with peak power significantly higher than average jammer power. Power-balanced return downlinks are used in order to mitigate negative communications performance impact on non-jammed beams in the presence of jamming on other beams. Additionally, synchronization of multiple gateways may be used so that orthogonal frequency-hopped signals synchronized to different gateways do not interfere with each other. For example, gateways may be independently synchronized to coordinated universal time (UTC) using local global positioning system (GPS) enabled devices.

Additionally, differences in propagation delay to the multiple gateways may be partially calibrated using ranging and ephemeris determination techniques. Residual calibration may be conducted by broadcasting a common beacon from a satellite to the multiple gateways. This one-way beacon provides a jam-resistant signal for use in calibration since turn-around ranging would be more vulnerable to jamming. The beacon may be multiplexed on the same transmitter as the return downlink.

Additionally, a common payload generated beacon may be used for gateway synchronization, system synchronization, system syntonization, and gateway and terminal antenna auto-tracking. A code may be used to resolve residual differential range ambiguity after using ephemeris estimation techniques. For example, a pseudorandom noise (PRN) code or a balanced PRN code can be used. A mission control system may monitor beacon transmissions to determine and correct satellite time and frequency drift relative to a master gateway and to determine and correct slave gateway time and frequency drift relative to a master gateway.

In a particular embodiment, processing that is performed in orbit on the satellite-based transponder may be limited to low-noise amplification, frequency conversion, gain/level control, linearization, high power and high gain amplification. In other embodiments, processing performed at the satellite-based transponder may also include dehopping and rehopping of signals based on time-of-day transmission security. In embodiments where dehopping and rehopping of signals is performed in space, a time stamped time-of-day-based beacon may be used to aid the gateway and mission control functions to advance uplink and retard downlink time-of-day to account for gateway propagation delay. In other embodiments, processing performed at the satellite-based transponder may also include digital channelization after dehopping of signals. Digital channelization enables hop-by-hop level control of each individual channel, eliminating power robbing effects in the downlink transmitter.

Accordingly, disclosed embodiments reduce development, deployment, and production costs of anti-jam satellite communications and provide improved anti-jam communications performance. Further, ground-based processing used in the embodiments disclosed facilitates rapid and cost-effective system upgrades that can be effectively synchronized with terminal upgrades.

Thus, future anti-jam waveforms may be supported readily which may include enhanced waveform features such as bandwidth-on-demand, adaptive coding and modulation, bandwidth efficient modulation, beam handover, label switching, packet-switching, Suite B crypto, resilience to blockage environment, increased data rates, or some combination thereof. Further, the disclosed embodiments support protected communication-on-the-move (COTM) and provide efficient support for interconnectivity to terrestrial users and services without using precious EHF spectrum. Moreover, the disclosed embodiments can be used to provide jammer standoff comparable to current state of the art systems but with higher data rates and with significantly higher antenna gain.

Thus, the illustrative embodiments provide a method and apparatus for communicating information. Different illustrative embodiments may provide different features from other illustrative embodiments. Further, features in the different examples described and depicted in the figures may be combined with features in other examples.

In one illustrative example, a gateway comprises a receiver, a signal processor, and a transmitter. The receiver is configured to receive a wideband frequency hopping signal from an originating terminal via a satellite transponder. The satellite transponder does not dehop the wideband frequency hopping signal. The signal processor is configured to dehop the wideband frequency hopping signal to form a processed signal. The transmitter is configured to transmit content of the processed signal to a destination terminal device.

The transmitter in the gateway may be configured to wideband frequency hop the processed signal to form a second forward wideband frequency hopping signal and transmit the second forward wideband frequency hopping signal to a second satellite transponder for relay to the destination terminal device.

The second forward signal formed by the transmitter in the gateway may not be wideband frequency hopped. Further, the transmitter in the gateway may be configured to transmit the processed signal to the destination terminal via a ground-based wired and/or wireless network. The transmitter in the gateway also may be configured to transmit the processed signal to the destination terminal via a synchronous optical network (SONET). Further, the transmitter in the gateway may be configured to transmit the processed signal to the destination terminal using internet protocol and/or other digital communications.

In another illustrative example, a gateway comprises a receiver and a signal processor. The receiver is configured to receive a beacon signal from a satellite-based transmitter. The signal processor is configured to use the beacon signal to synchronize, at the satellite, forward and return gateway signals with forward and return gateway signals from one or more additional gateways.

The beacon signal may be multiplexed with a return downlink signal received from the satellite-based transmitter. The beacon signal may comprise a pseudorandom noise code. The beacon signal also may comprise a ranging sequence. Further, a return downlink of the satellite-based transmitter may include two or more signals with different polarization.

The return downlink signal may be a wideband frequency hopping signal. The signal processor may be configured to dehop the wideband frequency hopping signal to form a processed signal. Also, the gateway may perform time-sensitive time synchronization acquisition and tracking processing.

The gateway may further comprise a transmitter to transmit content of the processed signal to a destination terminal. The signal processor may use the beacon signal to synchronize the gateway.

The gateway may include an antenna auto-tracking system coupled to the signal processor, wherein the antenna auto-tracking system uses the beacon signal to track the satellite-based transmitter.

In yet another illustrative example, a communication system comprises an antenna and a first gateway. The first gateway is coupled to the antenna and is configured to communicate with one or more terminal devices via a first transponder using wideband frequency hopping signals first transponder does not dehop the wideband frequency hopping signals.

The communication system also may include a second gateway device coupled to the antenna or to another antenna. The second gateway device may be co-located with the first gateway or located in a location that is geographically remote from the first gateway. The second gateway device may be further configured to communicate with the one or more terminal devices via a second transponder using wideband frequency hopping signals. The second transponder does not dehop the wideband frequency hopping signals and the second gateway device communicates with the one or more terminal devices via the second transponder concurrently with the first gateway device communicating with the one or more terminal devices via the first transponder.

The communication system also may comprise a mission control system coupled to the first gateway devices. The communication system also may comprise a payload control system coupled to the mission control system and configured to control signals to the first transponder via the mission control system and the first gateway. The control signals may include gain or level control or antenna pointing commands used to control return downlink transmitter gain or level settings or to control a pointing direction of an antenna of the first transponder.

The communication system may further comprise a resource control and mission planning system coupled to the mission control system and configured to control reservation of satellite and gateway communication resources and activation of the satellite and gateway communication resources. The resource control and mission planning system communicates with at least one of the first gateway and a second gateway.

The first transponder may be a component of a first satellite and the communications system may include at least one second transponder that is a component of a second satellite. The first satellite and the second satellite do not communicate directly with one another via a satellite crosslink to coordinate resource control and mission planning.

The communication system may further comprise a unified resource control and mission planning database coupled to the resource control and mission planning system. The unified resource control and mission planning database stores resource control and mission planning information related to a plurality of satellite transponder systems that facilitate communications between the one or more terminal devices.

The communication system may include a common resources control database that is used to manage system transponders including the first transponder and the at least one second transponder. The communication system may also include a common resource management database that is used for mission planning and resource control. A resource control system activates resources that are identified, allocated, and reserved in the common resource management database by a mission planning system.

The communication system may further comprise a central key facility that is coupled to the mission control system and configured to send frequency hop code information, transmission security keys, and access control keys to the one or more terminal devices. The frequency hop code information is used by the one or more terminal devices to determine a frequency hop pattern of the wideband frequency hopping signals.

The first gateway may be further configured to communicate with the one or more terminal devices via a second transponder using the wideband frequency hopping signals. The second transponder does not dehop the wideband frequency hopping signals. The first gateway device may include a terrestrial network interface adapted to be coupled to a terrestrial network.

The first gateway may be configured to receive data in a digital format via the terrestrial network and to send the data to a particular terminal device of the one or more terminal devices via the first transponder. The first gateway may be configured to receive data from a particular terminal device of the one or more terminal devices via the first transponder using the wideband frequency hopping signals and to send the data to a device coupled to the terrestrial network using a digital format via the terrestrial network. The terrestrial network may be a synchronous optical network.

The first gateway device may be configured to be switchable, independently for each feeder link polarization, between two frequency band or frequency polarization modes, including a $K_a$-band mode and an extremely high frequency (EHF)-band mode. When a first gateway feeder link polarization is a first frequency band or polarization mode, a user interface is comprised of signals in the first frequency band or polarization mode that are either non-hopped or wideband frequency hopped. When the first gateway feeder link polarization is a second frequency band or polarization mode, the user interface is comprised of signals in the second frequency band or polarization mode that are wideband frequency hopping signals.

The wideband frequency hopping signals may include first signals having a first polarization and second signals having a second polarization, the first polarization orthogonal to the second polarization. The first signals may have the first polarization and the second signals may have the second polarization. These signals are power balanced. The first signals having the first polarization and the second signals having the second polarization may use orthogonal frequency channels that are synchronously frequency hopped.

The wideband frequency hopping signals may be multiplexed with a beacon signal by the first transponder. The first gateway device uses the beacon signal to synchronize the first gateway device with at least one second gateway device. The first gateway may further use the beacon signal for synchronization. The first gateway device may provide information derived from the beacon signal to an auto-tracking system of the antenna.

In still another illustrative example, a command system comprises a processor and a memory. The memory is accessible to the processor. The memory stores instructions executable by the processor to cause the processor to send control signals to a plurality of satellite platforms via one or more terrestrial gateway devices. The control signals include resource control signals and mission planning signals.

The control signals may further include a payload control signal sent to at least one of a satellite platform and/or payload of the plurality of satellite platforms via the one or more terrestrial gateway devices. The payload control signal may be an antenna pointing signal. The instructions may be further executable by the processor to cause the processor to send transmission security (TRANSEC) information to one or more gateways of one or more terrestrial gateway devices.

The command system may further comprise a terrestrial network interface. The control signals are sent to the one or more terrestrial gateway devices via the terrestrial network interface using digital communications via a wired or wireless terrestrial network. The instructions may be further executable by the processor to cause the processor to maintain a unified resource control and mission planning database.

In another illustrative example, a satellite comprises a receiver and a transmitter. The receiver is configured to receive a wideband frequency hopping signal from a non-orbital transmitter. The transmitter is configured to retransmit the wideband frequency hopping signal to a non-orbital receiver without dehopping the wideband frequency hopping signal.

The retransmission by the transmitter may not be wideband frequency hopped. The wideband frequency hopping signal may not be filtered with narrowband filters before the transmitter retransmits the wideband frequency hopping signal.

The satellite may further comprises a linear transmitter for a return gateway link to mitigate negative communications performance impact due to intermodulation products, signal suppression, and power robbing due to received jammer signals, with average power higher than signals of interest and with instantaneous jammer power pulses with peak power higher than average jammer power. The satellite may further comprise narrow uplink beams to provide antenna isolation from unwanted jammer signals that may be present in a forward uplink band. The satellite may further comprise narrow beams to provide antenna isolation from unwanted jammer signals that may be present in a return uplink band.

The satellite may further comprise a beacon generator coupled to the transmitter. The beacon generator generates a beacon signal that is multiplexed with the wideband frequency hopping signal for transmission by the transmitter. The satellite may further comprise at least one second transmitter to transmit a second wideband frequency hopping signal to the non-orbital receiver or to a second non-orbital receiver concurrently with the transmitter retransmitting the wideband frequency hopping signal to the non-orbital receiver.

The transmitter may transmit the wideband frequency hopping signal using a first polarization. The at least one second transmitter transmits the second wideband frequency hopping signal using a second polarization that is orthogonal to the first polarization. The wideband frequency hopping signal and the second wideband frequency hopping signal may be power balanced. The signals may have a first polarization and a second polarization and may use orthogonal frequency channels that are synchronously frequency hopped.

In still another illustrative example, a terminal device comprises a transmitter. The transmitter is configured to send a wideband frequency hopping signal to a destination device via a satellite transponder. The satellite transponder does not dehop the wideband frequency hopping signal before retransmitting the wideband frequency hopping signal to a non-orbital receiver.

In yet another illustrative example, a terminal device comprises a terrestrial network interface that is adapted to send data to a destination device by transmitting an internet protocol or other digital signal to a satellite uplink station that communicates with the destination device by sending a wideband frequency hopping signal to a satellite transponder. The satellite transponder does not dehop the wideband frequency hopping signal before retransmitting the wideband frequency hopping signal to a non-orbital receiver.

In another illustrative example, a method comprises sending a first wideband frequency hopping signal from a first terminal device to a satellite; receiving the wideband frequency hopping signal at the satellite and relaying the wideband frequency hopping signal to a ground station without dehopping the wideband frequency hopping signal; processing the wideband frequency hopping signal at the ground station, wherein processing the wideband frequency hopping signal includes dehopping the wideband frequency hopping signal; sending a second forward wideband frequency hopping signal including content of the wideband frequency hopping signal from the ground station to the satellite or to a second satellite, or from the ground station to the satellite or to the second satellite via a second ground station; and receiving the second forward wideband frequency hopping signal at the satellite or the second satellite and relaying the wideband frequency hopping signal to a second terminal device without dehopping the second wideband frequency hopping signal. A second forward signal is not wideband frequency hopped.

The ground station in the method may include multiple gateways. Each of the multiple gateways is configured to process multiple communication links concurrently. The wideband frequency hopping signal in the method may be an extended data rate (XDR) waveform, or an alternate waveform or combination of waveforms that includes enhanced waveform features including one or more of bandwidth-on-demand, adaptive coding and modulation, bandwidth efficient modulation, beam handover, label and/or packet-switching, Suite B crypto, and resilience to blockage environment. The extended data rate waveform may be fully processed, including forward error correction encoding and decoding and channel interleaving and de-interleaving, at a gateway. The method may further comprise multiplexing a beacon signal with the first wideband frequency hopping signal when the first wideband frequency hopping signal is relayed from the satellite to the ground station.

In still another illustrative example, a method comprises receiving, at a gateway device, data from a ground terminal via wired or unwired connection using an internet protocol or other digital communication and transmitting the data in a wideband frequency hopping signal to a destination device via a satellite transponder. The satellite transponder does not dehop the wideband frequency hopping signal before retransmitting the wideband frequency hopping signal to the destination device.

In still yet another illustrative example, a method comprises receiving, at a gateway device, data from a satellite transponder via a wideband frequency hopping signal; dehopping the wideband frequency hopping signal at the gateway device; and transmitting the data in a second signal to a destination device via wired or unwired connection using an internet protocol or other digital communication.

In an illustrative example, a method for processing a signal is present. The method may include encoding information in a frequency hopping signal; and sending the frequency hopping signal to a gateway in a communications network through a satellite, wherein the frequency hopping signal is unprocessed by the satellite to identify the information in the frequency hopping signal.

The method may further include processing the frequency hopping signal to form a processed signal. Additionally the method may also include sending the processed signal to at least one of a terminal device, the satellite, another satellite, another gateway, and a control system. Further the method may include receiving the signal in a receiver system in a satellite, wherein the signal has a range of frequencies in which information is carried in a number of channels having a number of frequencies within the range of frequencies, wherein the number of frequencies for a channel in the number of channels changes within the range of frequencies over time; and transmitting the signal using a transmitter system in the satellite, wherein the signal is processed to identify the number of frequencies for a channel in the number of channels used to carry the information by the satellite, and wherein the signal is digitally processed so that its gain and power level can be controlled on a dynamic hop-by-hop basis in order to control power robbing in the transponder. The signal may be further digitally processed so that its channelization bandwidth can be controlled on a dynamic hop-by-hop basis in order to control power robbing in the transponder.

In another illustrative example, an apparatus comprises a receiver system and a transmitter system. The receiver system in a satellite is configured to receive a signal having a range of frequencies in which information is carried in a number of channels having a number of frequencies within the range of frequencies, wherein the number of frequencies for the channel changes within the range of frequencies over time. The transmitter system in the satellite is configured to transmit the signal, wherein the signal is processed to identify the number of frequencies for a channel in the number of channels used to carry the information by the satellite, and wherein the signal is digitally processed so that its gain and power level can be controlled on a dynamic hop-by-hop basis in order to control power robbing in the transponder. The signal may be further digitally processed so that its channelization bandwidth can be controlled on a dynamic hop-by-hop basis in order to control power robbing in the transponder.

The apparatus also may include a beacon generator in the satellite, wherein the beacon generator is configured to generate beacon information and the transmitter system is configured to include the beacon information in the signal. The beacon information may include a timestamp and at least one of a pseudo random sequence, a ranging sequence, and a pseudorandom noise code.

In another illustrative example, a method of processing a signal is present and includes receiving the signal in a receiver system in a satellite, wherein the signal has a range of frequencies in which information is carried in a number of channels having a number of frequencies within the range of frequencies, wherein the number of frequencies for a channel in the number of channels changes within the range of frequencies over time; and transmitting the signal using a transmitter system in the satellite, wherein the signal is processed to identify the number of frequencies for a channel in the number of channels used to carry the information by the satellite, and wherein the signal is digitally processed so that its gain and power level can be controlled on a dynamic hop-by-hop basis in order to control power robbing in the transponder. The signal may be further digitally processed so that its channelization bandwidth can be controlled on a dynamic hop-by-hop basis in order to control power robbing in the transponder.

In the illustrative examples, the method may include a scheme to synchronize the payload and the gateway with a beacon generator, wherein the beacon information includes a timestamp and at least one of a pseudo random sequence, a ranging sequence, and a pseudorandom noise code.

In another illustrative example, A communication system may also include a receiver system in a satellite configured to receive a signal having a range of frequencies in which information is carried in a number of channels having a number of frequencies within the range of frequencies, wherein the number of frequencies for the channel changes within the range of frequencies over time; and a transmitter system in the satellite configured to transmit the signal, wherein the signal is processed to identify the number of frequencies for a channel in the number of channels used to carry the information by the satellite, and wherein the signal is digitally processed so that its gain and power level can be controlled on a dynamic hop-by-hop basis in order to control power robbing in the transponder. The signal may be further digitally processed so that its channelization bandwidth can be controlled on a dynamic hop-by-hop basis in order to control power robbing in the transponder. The communications system may also include a beacon generator in the satellite, wherein the beacon generator is configured to generate beacon information and the transmitter system is configured to include the beacon information in the signal. The beacon information includes a timestamp and at least one of a pseudo random sequence, a ranging sequence, and a pseudorandom noise code.

In still another illustrative example, An apparatus comprises a receiver system in a gateway configured to receive a signal from a satellite, wherein the signal has a range of frequencies in which information is carried in a number of channels having a number of frequencies within the range of frequencies, wherein the number of frequencies for the channel changes within the range of frequencies over time and wherein the signal is unprocessed by the satellite to identify the number of frequencies for a channel in the number of channels used to carry the information by the satellite; and a communications processor in the gateway configured to process the signal to identify the channel in the number of frequencies within the range of the frequencies to form a processed signal and transmit the processed signal to a destination device. The apparatus also may comprise a receiver system in a satellite configured to receive a signal having a range of frequencies in which information is carried in a number of channels having a number of frequencies within the range of frequencies, wherein the number of frequencies for the channel changes within the range of frequencies over time; and a transmitter system in the satellite configured to transmit the signal, wherein the signal is processed to identify the number of frequencies for a channel in the number of channels used to carry the information by the satellite, and wherein the signal is digitally processed so that its gain and power level can be controlled on a dynamic hop-by-hop basis in order to control power robbing in the transponder. The signal is further digitally processed so that its channelization bandwidth can be controlled on a dynamic hop-by-hop basis in order to control power robbing in the transponder. The apparatus also may include a beacon generator in the satellite, wherein the beacon generator is configured to generate beacon information and the transmitter system is configured to include the beacon information in the signal. The beacon information includes a timestamp and at least one of a pseudo random sequence, a ranging sequence, and a pseudorandom noise code.

The description of the different illustrative embodiments has been presented for purposes of illustration and description, and is not intended to be exhaustive or limited to the embodiments in the form disclosed. Many modifications and variations will be apparent to those of ordinary skill in the art. As another example, one or more illustrative embodiments may also be used with spacecraft traveling in space but not in orbit around the Earth. These spacecraft may also relay signals without hopping or dehopping. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A communication system comprising:
a number of terminals configured to send and receive information, such that, in operation, the number of terminals sends and receives the information;
a number of gateways configured to send and receive the information, such that, in operation, the number of gateways sends and receives the information;
a number of satellites; and
a control system located terrestrially and configured to:
control the number of terminals, the number of gateways, and the number of satellites, to transfer, via synchronizing reception of all signals at a satellite in the number of satellites via synchronizing transmissions of uplink signals from the number of terminals and the number of gateways, such that a signal in the all signals comprises a frequency hopping signal that comprises each hop characterized by at least one of an individual: gain, and power level, being digitally adjusted on the satellite on a hop-by-hop basis such that each hop comprises particular frequencies, carrying a particular portion of the information at a particular point in time; and
control a tunable master oscillator used to lock a time and a frequency of the frequency hopping signal transmitted by the satellite, such that, in operation, the control system:
controls the number of terminals, the number of gateways, and the number of satellites, to transfer, via synchronizing reception of all signals at the satellite in the number of satellites via synchronizing transmissions of uplink signals from the number of terminals and the number of gateways, the signal in the all signals being the frequency hopping signal, and each hop characterized by at least one of the individual: gain, and power, being digitally adjusted on the satellite on the hop-by-hop basis; and
controls the tunable master oscillator used to lock the time and the frequency of the frequency hopping signal transmitted by the satellite.

2. The communication system of claim 1, wherein a gateway in the number of gateways is configured to identify the information carried by the frequency hopping signal to form a processed signal.

3. The communication system of claim 2, wherein the gateway is configured to send the processed signal to at least one of a terminal device, the satellite, another satellite, another gateway, and the control system.

4. The communication system of claim 2, wherein the processed signal is another frequency hopping signal.

5. The communication system of claim 1, wherein the control system includes at least one of a mission control system, a payload control system, a resource control system, a mission planning system, a key facility, and a health management system.

6. The communication system of claim 1, further comprising the particular frequencies comprising discontinuous frequencies.

7. An apparatus comprising:
a control system, terrestrial based, configured to synchronize reception of a frequency hopping signal at a satellite via synchronizing transmissions, of signals from a number of terminals and a number of gateways in a communication network, to the satellite, such that in operation the control system synchronizes reception of the frequency hopping signal at the satellite via synchronizing transmissions, of signals from the number of terminals and the number of gateways in the communication network, to the satellite;
a transmitter system, in the satellite, configured to transmit the frequency hopping signal, such that in operation the transmitter system transmits the frequency hopping signal, such that the frequency hopping signal comprises: a channelization bandwidth, a gain, and a power level, such that the satellite digitally adjusts, via individually adjusting at least one of: an individual gain, and a power level, of each frequency hop in the frequency hopping signal on a hop-by-hop basis such that each hop comprises particular frequencies carrying a particular portion of information at a particular point in time;
the frequency hopping signal configured to lock to a tunable master oscillator controlled by the control system systematically controls the gain, the power level, and the channelization bandwidth, on a dynamic hop-by-hop basis;
a receiver system in a gateway, in the number of gateways, configured to receive the frequency hopping signal from the satellite, the frequency hopping signal comprising a range of frequencies in which information is carried in a number of channels having a number of frequencies within the range of frequencies, such that the number of frequencies for a channel changes within the range of frequencies over time, such that, in operation, the receiver system in the gateway receives the frequency hopping signal from the satellite; and
a communication processor, in the gateway, configured to identify the channel in the number of channels and transmit the frequency hopping signal to a destination device, such that, in operation, the communication processor, in the gateway, identifies the channel in the number of channels and transmits the frequency hopping signal to the destination device.

8. The apparatus of claim 7, wherein the frequency hopping signal having the range of frequencies is a wideband frequency hopping signal in which the number of frequencies for the channel changes within the range of frequencies.

9. The apparatus of claim 7, wherein the communication processor is configured to transmit a processed signal using the frequency hopping signal.

10. The apparatus of claim 7, wherein a processed signal is transmitted to at least one of a selected satellite, a computer, and another gateway.

11. The apparatus of claim 7, further comprising jam resistant beacon information, such that the control system uses the beacon information to:
track a location of the satellite that transmits the beacon information;
synchronize the satellite, the number of terminals, and the number of gateways, and enable antenna autotracking.

12. The apparatus of claim 7, further comprising the gateway being associated with a platform selected from one of an aircraft, a surface ship, a ground vehicle, a submarine, a building, a spacecraft, a space station, and a human operator.

13. The apparatus of claim 7, further comprising the frequency hopping signal being a first signal such that the receiver system in the gateway receives the first signal with a first polarization and a second signal with a second polarization having the range of frequencies at a same time.

14. The apparatus of claim 13, wherein the first polarization is orthogonal to the second polarization.

15. The apparatus of claim 7, further comprising the particular frequencies comprising discontinuous frequencies.

* * * * *